United States Patent
Patil et al.

(10) Patent No.: US 11,074,617 B2
(45) Date of Patent: Jul. 27, 2021

(54) IN-VEHICLE ACCESS

(71) Applicant: Visa International Service Association, San Francisco, CA (US)

(72) Inventors: Ajit Vilasrao Patil, Singapore (SG); Santosh Lachhman Achhra, Singapore (SG); Martin Enriquez, San Ramon, CA (US); Sukalyan Chakraborty, Foster City, CA (US); Varun Sharma, Singapore (SG); Satyanarayan Belur, San Jose, CA (US); Diane C. Salmon, Lafayette, CA (US); Michael Lemberger, Menlo Park, CA (US); Kelvan Howard, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 187 days.

(21) Appl. No.: 16/061,190

(22) PCT Filed: Jan. 6, 2017

(86) PCT No.: PCT/US2017/012601
§ 371 (c)(1),
(2) Date: Jun. 11, 2018

(87) PCT Pub. No.: WO2017/120518
PCT Pub. Date: Jul. 13, 2017

(65) Prior Publication Data
US 2018/0374126 A1 Dec. 27, 2018

Related U.S. Application Data

(60) Provisional application No. 62/276,666, filed on Jan. 8, 2016.

(51) Int. Cl.
| | |
|---|---|
| *G06Q 30/02* | (2012.01) |
| *H04W 4/00* | (2018.01) |
| *G01S 5/00* | (2006.01) |
| *H04W 4/40* | (2018.01) |
| *B60W 40/08* | (2012.01) |

(Continued)

(52) U.S. Cl.
CPC ......... *G06Q 30/0266* (2013.01); *B60W 40/08* (2013.01); *G01S 5/0027* (2013.01); *G06Q 30/02* (2013.01); *G06Q 30/0241* (2013.01); *G07C 5/008* (2013.01); *H04W 4/00* (2013.01); *H04W 4/027* (2013.01); *H04W 4/40* (2018.02); *B60W 2040/0809* (2013.01)

(58) Field of Classification Search
CPC ........................................ G06Q 30/0207–0277
See application file for complete search history.

(56) References Cited

U.S. PATENT DOCUMENTS

| | | | |
|---|---|---|---|
| 8,793,031 B2 | 7/2014 | Anantha et al. | |
| 9,298,575 B2 * | 3/2016 | Tamari ................ | G08G 1/0141 |

(Continued)

FOREIGN PATENT DOCUMENTS

KR    20000054736 A    9/2000

*Primary Examiner* — Chrystina E Zelaskiewicz
(74) *Attorney, Agent, or Firm* — The Webb Law Firm

(57) ABSTRACT

A system and method to communicate individualized/customized messages to a vehicle based on the location of the vehicle, operation statuses the vehicle, and/or mobile devices of occupants of the vehicle.

16 Claims, 7 Drawing Sheets

(51) Int. Cl.
*G07C 5/00* (2006.01)
*H04W 4/02* (2018.01)

(56) References Cited

U.S. PATENT DOCUMENTS

| | | |
|---|---|---|
| 2007/0061057 A1 | 3/2007 | Huang et al. |
| 2008/0054072 A1 | 3/2008 | Katragadda et al. |
| 2012/0108163 A1* | 5/2012 | Bai .................. H04W 4/06 455/3.06 |
| 2013/0132172 A1* | 5/2013 | Liu .................. G06Q 30/02 705/14.5 |
| 2014/0019252 A1 | 1/2014 | MacNeille et al. |
| 2014/0304053 A1* | 10/2014 | Schwarz .............. G08G 1/0962 705/14.25 |

* cited by examiner

IN-VEHICLE ACCESS

RELATED APPLICATIONS

The present application claims the benefit of the filing date of Prov. U.S. Pat. App. Ser. No. 62/276,666, filed Jan. 8, 2016 and entitled "In-Vehicle Access", the entire disclosure of which application is hereby incorporated herein by reference.

The present application relates to U.S. patent application Ser. No. 14/932,665, filed Nov. 4, 2015 and entitled "In-Vehicle Access Application", and U.S. patent application Ser. No. 15/043,381, filed Feb. 12, 2016, entitled "Systems and Methods Implementing a Communication Protocol for Data Communication with a Vehicle", and claimed priority to Prov. U.S. Pat. App. Ser. No. 62/117,896, filed Feb. 18, 2015 and entitled "Systems and Methods Implementing a Communication Protocol for Data Communication with a Vehicle", the entire disclosures of which applications are hereby incorporated herein by reference.

FIELD OF THE TECHNOLOGY

At least some of the technologies disclosed herein relate to vehicles and communications.

BACKGROUND

As a result of recent developments in the automobile industry, there are vehicles equipped with sophisticated infotainment systems configured to provide information and/or entertainment.

For example, some vehicles provide Bluetooth communication capabilities that allow a mobile phone with Bluetooth transceivers to make hands free phone calls and/or play music stored as digital files on the mobile phone, using the audio system of a vehicle.

For example, some vehicles provide satellite receivers to receive data and/or information, such as data streams for digital satellite radio.

For example, some vehicles provide cellular transceivers that allow a user to remotely monitor the location and/or status of a vehicle, remotely lock or unlock the vehicle, and/or remotely start the vehicle.

For example, some vehicles have in-vehicle entertainment systems to provide access to Internet-based media content, such as streaming radio programs, music, television programs, etc.

U.S. Pat. App. Pub. No. 2014/0129599 discloses a personalized data management system, in which data collected by a connected vehicle may be communicated to a vehicle specific cloud for storage and/or use by a service provider associated with the vehicle cloud. U.S. Pat. App. Pub. No. 2014/0201004 discloses interactive in-vehicle advertisements that are presented to a user in a vehicle based on user data and contextual data. U.S. Pat. App. Pub. No. 2016/0066013 discloses a portable and personalized infotainment system in connected cars.

The entire disclosures of the above discussed patent documents are hereby incorporated herein by reference.

BRIEF DESCRIPTION OF THE DRAWINGS

The disclosure provided herein is illustrated by way of example and not limitation in the figures of the accompanying drawings in which like references indicate similar elements.

DETAILED DESCRIPTION

Figure 1:
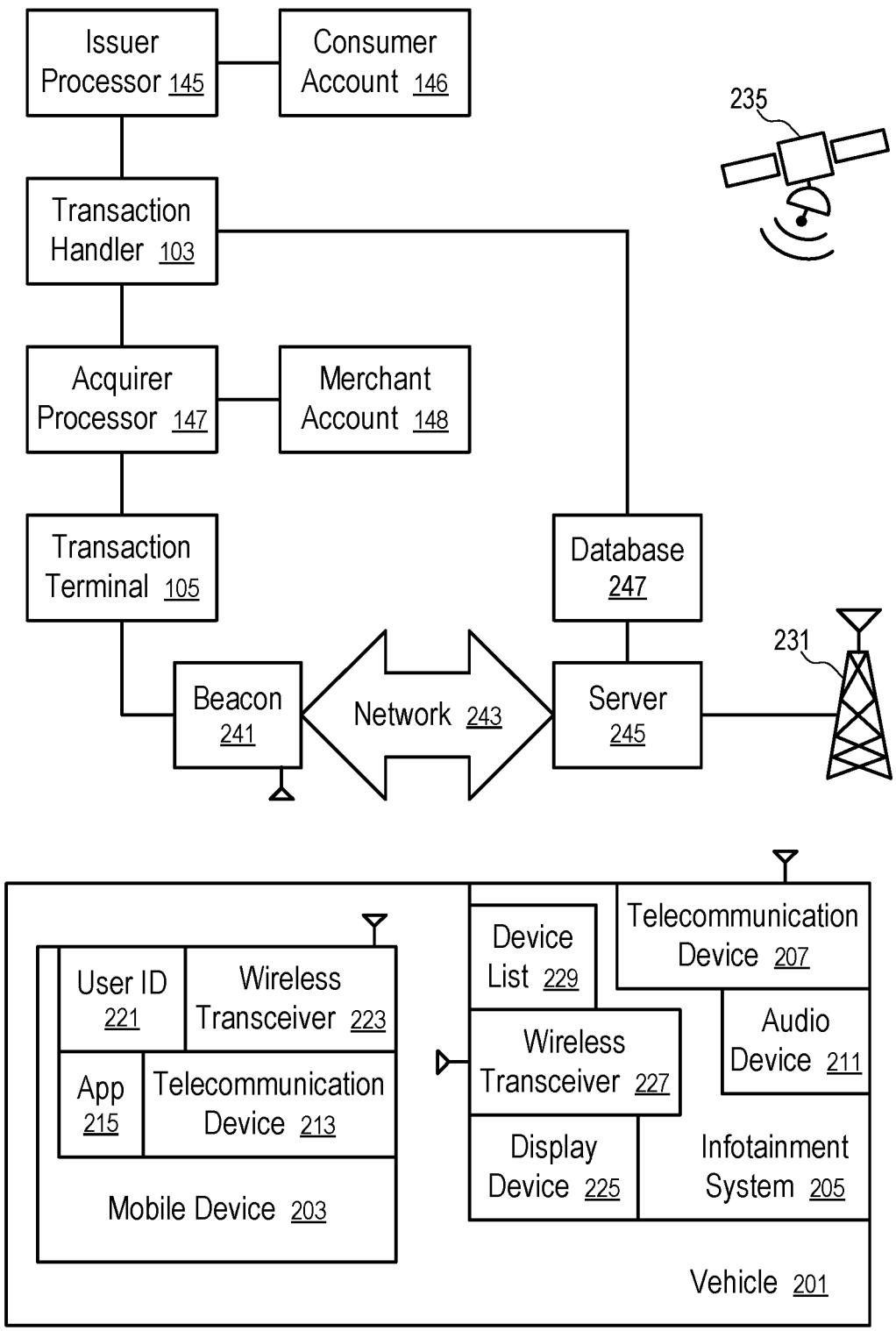
FIG. 1 shows a system configured to establish a data connection to the infotainment system of a vehicle.

A system is provided to establish a communication connection between a vehicle and a remote computing device and use the communication connection to transmit data to the vehicle for presentation to occupants of the vehicle.

The system may interrogate the vehicle to obtain the identities of the driver and/or the passengers. Based on the identities of the passengers and/or the driver, a communication connection is established to the infotainment system of the vehicle. The communication connection can be used to present data relevant to the passenger/driver, with improved privacy protection and customized content.

For example, after a user of a car provides the consent for the system of the present disclosure to provide services, the infotainment system of the car is configured to allow a beacon device of the system to initiate a request to make a data connection.

For example, the beacon device can be installed at a predetermined location of a pathway, such as a parking space of a merchant, a parking lot, a driveway, a drive-through order-placing lane, etc. The beacon device provides the identity of the location and/or the system to the infotainment system of the vehicle and requests information from the vehicle (e.g., via a Bluetooth connection, or a WiFi connection) in order to establish a data connection between the remote computing device and the vehicle.

The infotainment system scans the interior of the car for wireless signals, such as Bluetooth, SSID, or RFID signals from personal electronic devices, such as mobile phones, smartphones, portable media players, tablet computers, etc. Without making a direct connection with a user device, the infotainment system identifies the user device through a unique identifier that is attached to or encoded in the device's "friendly name."

The beacon device receives the identifier from the infotainment system of the vehicle and transmits the identifier to a server configured on the remote computing device, which maps the user device to an identity of the user. In some implementations, the beacon device is configured to map the user device to the identity of the user with the help of the server configured on the remote computing device.

For instance, if a phone number is discovered, the server may communicate with the associated telecommunication carrier of the phone to determine the identity of the user and/or other information, such as account information of a consumer account of the user (e.g., if the user has enrolled in a program to receive services of the remote computing device).

After the identity of the user is determined, the system is configured to establish a data connection to the infotainment system of the vehicle based on the identity of the user.

For example, via the telecommunication carrier of the phone, the system may establish a data connection to an application running in the phone, which further connects to the infotainment system of the vehicle.

Alternatively, with user approval, the system may establish a connection to a communication device of the infotainment system of the vehicle without going through the phone of the user. For example, if the vehicle of the user is equipped with a cellular communications system, the server may establish a data connection with the cellular communications system of the vehicle without going through the mobile device of the user. In some instances, a satellite communication link can be used to deliver information the infotainment system of the vehicle.

A communication connection can be made to the infotainment system of the vehicle through the beacon device. For example, the remote computing device is connected to the beacon device via a data communication network, and the beacon device is further connected to the vehicle via a wireless connection (e.g., Bluetooth or WiFi). Such a connection made though the beacon device may be preferred when the vehicle is within a relative short communication range of the wireless connection (e.g., Bluetooth or WiFi) (e.g., within a short period time). However, when the vehicle is likely to move out of the communication range of the wireless communication with the beacon device during a communication session, a connection made through a wireless connection that has a relative long communication range and that does not go through the beacon device may be preferred, such as a satellite link to the vehicle, a cellular communication connection to the vehicle, a cellular communication connection to a mobile device that is in turn connected to the vehicle via a relative short communication range (e.g., Bluetooth or WiFi).

The data communication connection can be used to present customized and/or personalized content for presentation on the infotainment system of the vehicle.

For example, a transaction handler of a payment processing system may use the data connection to send targeted offers to the infotainment system of the vehicle based on the identity of the passengers/driver. The selection of the targeted offer can be configured to avoid content inappropriate to some of the passengers/driver. The targeted offer can be configured to be relevant to at least one of the individuals in the vehicle, regardless of whether the vehicle belongs to them or not.

For example, an owner of a vehicle may register the service of the transaction handler to receive targeted offers. During registration, the owner may identify potential occupants of the vehicle. When the vehicle is in the vicinity of the beacon device, the identity of the vehicle is determined to initiate the service. At least a portion of the actual occupants of the vehicle is identified via the mobile devices carried by the occupants. Some of the occupants may not be pre-registered in the service. The infotainment system may also identify the presence of unknown occupants based on sensors configured in the vehicle, such as sensors in the seats of the vehicles and/or sensors to detect whether the seat belts of the vehicles are buckled up. Further, a mobile application running on a mobile device of an occupant may be used to optionally identify whether the user of the mobile device is currently with other persons and/or the identities of the other persons. Based on the identities of the occupants and/or the potentially unknown accompanying persons in the vehicle, the server identifies targeted offers that are suitable for presentation via one or more display devices of the infotainment system of the vehicle and/or the audio system of the vehicle, while blocking content that may cause embarrassments and/or that may be inappropriate for some of the audience in the vehicle.

For example, a system and method can be configured to detect the identity of a car and/or the driver/passenger when the car is in the vicinity of a terminal, such as a gas pump, a drive-through service window, a parking spot, a driveway, a drive-through lane for a product or service. The terminal uses RFID, Bluetooth, or other electronic token provided on the car to determine an identity of the car. The system also uses the Bluetooth connection of the infotainment system of the car to detect an identity of the primary user currently present in the car. Based on the identity of the car and/or the identity of the primary user, a data connection is established to the infotainment system of the car. The connection can be made via the infotainment system of the car, via a satellite connection (e.g., OnStar), a built-in cellular connection of the infotainment system, a mobile phone connected to the infotainment system of the car, a Bluetooth connection to the terminal, a WiFi connection to an access point of the terminal, etc. The identity of the occupant in the car can be used to authorize the connection via the terminal, authorize the connection to the vehicle, identify a communication reference for the initiation of the connection, and/or instruct the vehicle or a mobile device to initiate the data connection, etc. The data connection can be used to transmit a personalized, customized, and/or targeted offer to the infotainment system of the car for presentation to the audience in the vehicle.

FIG. 1 shows a system configured to establish a data connection to the infotainment system of a vehicle.

In FIG. 1, a vehicle (201) is configured with an infotainment system (205) having a wireless transceiver (227). The wireless transceiver (227) may be configured for wireless local area network (WLAN) communications (e.g., WiFi), wireless personal area network (WPAN) communications (e.g., Bluetooth), near field communications (NFC), and/or radio frequency identification (RFID) communications.

The infotainment system (205) can be paired with one or more mobile devices for data connections between the mobile devices and the infotainment system (205) via the wireless transceiver (227). The infotainment system (205) stores a device list (229) that identifies the devices that have been paired with the infotainment system (205) for communications and/or have been detected to have been in the vehicle (201).

For example, a mobile device (203) having a wireless transceiver (223) compatible with the wireless transceiver (227) of the infotainment system (205) of the vehicle (201) can be paired with the infotainment system (205). For examples, the wireless transceiver (223) and the wireless transceiver (227) can be configured to support Bluetooth communications that may be used for making telephone calls or playing music via the audio device (211) of the infotainment system (205).

For example, the wireless transceiver (223) and the wireless transceiver (227) may support wireless local area network communications via a shared access point (e.g., WiFi hot spot), or an ad hoc connection.

Optionally, the wireless transceiver (223) of the mobile device (203) is configured as an access point, providing internet access to the wireless transceiver (227) of the vehicle (201) via the telecommunication device (213) of the mobile device (203). For example, when the mobile device (203) includes as a cellular phone, the telecommunication device (213) of the mobile device (203) is configured for cellular communications with base stations (e.g., 231) of a cellular communication network.

Optionally, the wireless transceiver (227) of the vehicle (201) is configured as an access point, providing internet access to the wireless transceiver (223) of the mobile device (203) via the telecommunication device (207) of the vehicle (201). For example, when the telecommunication device (207) may include as a cellular transceiver for cellular communications with base stations (e.g., 231) of a cellular communication network.

Optionally, a separate access point is provided to connect the wireless transceiver (223) of the mobile device (203) and the wireless transceiver (227) of the vehicle (201) in a network for data communications.

The mobile device (203) can be configured to store data that identifies the user ID (221) and a mobile application (215) that facilitates establishing of the data connection between the server (245) and the infotainment system (205).

In FIG. 1, a beacon device (241) is disposed at location in the vicinity of a transaction terminal (105). The beacon device (241) is configured to detect the presence of the vehicle (201) and/or the mobile device (203) near the beacon device (241) and provides an identity of the beacon to the infotainment system (205) and/or the mobile device (203). The identity transmitted by the beacon allows the infotainment system (205) and/or the application (215) running in the mobile device (203) to determine whether or not to further communicate with the beacon device (241) and/or the server (245). Optionally, the infotainment system (205) transmits an identity of the vehicle (201) (or the user ID (221) of the mobile device (203) connected to the infotainment system (205)) to the beacon device (241) as a token to initiate a payment transaction in a consumer payment account (146) associated with the identity of the vehicle (201).

The beacon device (241) communicates with the infotainment system (205) via the wireless transceiver (227) and/or communicates with the mobile device (203) via the wireless transceiver (223). After a determination that the vehicle (201) is registered to receive services via the beacon device (241), the beacon device (241) communicates with the infotainment system (205) to identify the identities of mobile devices (e.g., 203) that are currently in the vehicle (201) and/or other persons that may be in the vehicle (201).

For example, the wireless transceiver (227) of the infotainment system (205) of the vehicle (201) is configured to scan wireless signals to identify the presence of devices that are in the device list (229). Any users of the devices on the device list (229) are considered the primary users. The beacon device (241) transmits the identification information of the primary users to the server (245) over a data communication network (243) to determine whether or not to establish a connection to the infotainment system (205) of the vehicle (201) and if so, to identify a way to establish a data connection to the vehicle (201).

In one example, a data connection between the server (245) and the infotainment system (205) of the vehicle (201) can be established via the wireless communication link between the beacon device (241) and the wireless transceiver (227) for a duration when the vehicle (201) is within a communication range between the wireless communication link.

In another example, the beacon device (241) detects the presence of the vehicle (201) and provides its identity to the infotainment system (205) to request a data connection between the infotainment system (205) and the server (245).

In a further example, the beacon device (241) detects the presence of the vehicle (201) in the vicinity of the beacon device (241), determines the identity of the vehicle (201) and/or the mobile device (203) (e.g., based on registration/enrollment data) and provides its identity to the mobile device (203) to request a data connection between the infotainment system (205) and the server (245).

The server (245) may request, based on the identity of the vehicle (201) and via the telecommunication device (207) of the vehicle (201), for a data connection to the infotainment system (205) based on the identity of the vehicle (201).

The server (245) may request, based on the identity of the mobile device (203) and via the telecommunication device (213) of the vehicle (201), for a data connection to the application (215) running in the mobile device (203), where the application (215) further connects to the infotainment system (225) over the wireless link between the wireless transceiver (223) of the mobile device (203) and the wireless transceiver (227) of the vehicle (201).

A data connection between the server (245) and the infotainment system (205) can be established via the telecommunication device (207) of the vehicle (201) and the base station (231) of a cellular communication network, a satellite (235) of satellite communication network, and/or the telecommunication device (213) of the mobile device (203) bridged by the wireless link between the wireless transceiver (223) of the mobile device (203) and the wireless transceiver (227) of the vehicle (201).

In one implementation, in response to a connection request, the infotainment system (205) scans the wireless signals it receives via the wireless transceiver (227) to identify primary users of mobile devices that are in the device list (229). Optionally, the infotainment system (205) may further identify secondary users of mobile devices who are not on the device list (229). The identity information of the primary and/or second users are transmitted to the server (245) via the data connection established via the beacon device (241), the telecommunication device (213) of the mobile device (203), or the telecommunication device (207) of the vehicle (201). Thus, the server (245) can provide contents customized for the users to the infotainment system (205) for presentation via the display device (225) and/or the audio device (211).

For example, the customized content may include an offer from the merchant operating the transaction terminal (105). The offer can be selected by the server (245) based on the location of the beacon device (241), the identity of the user of the mobile device (203) (e.g., as identified by user ID (221) associated with the mobile application (215)), and/or the identities of other users on the vehicle (201). The offer can be customized based on the transaction data of payment transactions of the users which are processed via an electronic payment processing networking having a transaction handler (103) interconnecting at least one acquirer processor (e.g., 147) controlling merchant accounts (e.g., 148) and at least one issuer processor (e.g., 145) controlling consumer accounts (e.g., 146).

The offer can be stored in association with the consumer account (146). Thus, if the user of the mobile device (203) uses the consumer account (146) to make the payment on the transaction terminal (105), the transaction handler (103) identifies the payment transaction in the electronic payment processing network and provides the benefit of the offer to the payment transaction.

Optionally, the infotainment system (205) or the mobile application (215) is configured to transmit the account information of the consumer account (146) to the transaction terminal (105) and/or the beacon device (241) to initiate the payment transaction.

FIG. 1 illustrates an example of the interaction between a mobile device (203) and the infotainment system (205). In general, the infotainment system (205) may interact with a plurality of mobile devices (e.g., 203) in the vehicle (201) to collect identification information and establish a communication connection with the server (245). Optionally, multiple connections via mobile devices (e.g., 203) are established for improved communication bandwidth for the transmission of a burst of data. Optionally, a primary mobile device (e.g., 203) in the vehicle is selected (e.g., based on the presence frequency of mobile devices on the vehicle (201)) to establish the communication connection with the remote server (245).

FIG. 1 illustrates an example of one beacon device (241). In general, the system may include a plurality of beacon devices (e.g., 241) disposed at different locations and remote from the server (245). The targeted offers are based on not only the identities of the occupants of the vehicle and the identity of the vehicle, but also the location of the beacon device (241) that is closest to the vehicle (201).

Figure 2:
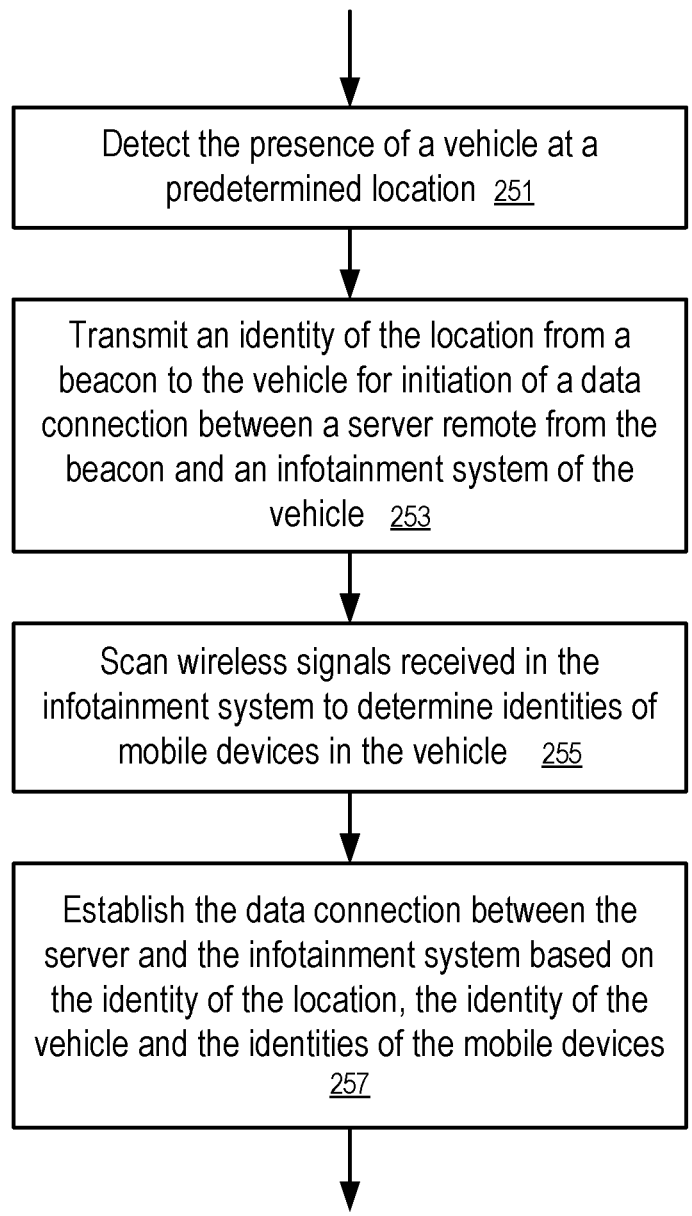
FIG. 2 shows a method to establish a data connection to the infotainment system of a vehicle.

FIG. 2 shows a method to establish a data connection to the infotainment system of a vehicle. For example, the method of FIG. 2 can be implemented in a system illustrated in FIG. 1 and/or in combination with methods and systems discussed in the following sections.

In FIG. 2, a computing system is configured to: detect (251) the presence of a vehicle (201) at a predetermined location; transmit (253) an identity of the location from a beacon device (241) to the vehicle (201) for initiation of a data connection between a server (245) remote to the beacon device (241) and an infotainment system (205) of the vehicle (201); scan (255) wireless signals received in the infotainment system (201) to determine identities of mobile devices (e.g., 203) in the vehicle; and establish (257) the data connection between the server (245) and the infotainment system (205) based on the identity of the location associated with beacon device (241), the identity of the vehicle (201), and the identities of the mobile devices (e.g., 203).

For example, the data connection may be established via the mobile device (203) in the device list (223) maintained in the infotainment system (205), where the device list (223) identifies the devices (e.g., 203) that have been paired with the infotainment system (205). The data connection may not go through the beacon device (241). The data connection may be initiated by the server (245), or initiated by a mobile application running in the mobile device (203).

For example, after the infotainment system (205) determines that the mobile device (203) is a primary user in view of the device list (229), the infotainment system (205) establishes a wireless connection between the wireless transceivers (223 and 227) of the mobile device (203) and the vehicle (201) and requests the mobile application (215) to use the telecommunication device (213) to establish a connection to the server (245) via a base station (231) of a cellular communication network.

For example, after the infotainment system (205) determines that the mobile device (203) is a primary user in view of the device list (229), the infotainment system (205) provides the user ID (221) associated with the mobile device (203) and/or the mobile application (215) to the beacon device (241), which forwards the information to the server (245) to allow the server (245) to request a connection to the mobile device (203) over the base station (231) of a cellular communication network and the telecommunication device (213) of the mobile device (203). The mobile device (203) subsequently uses the mobile application (215) to manage the connection to the server (245) and further connects to the infotainment system (205) via a wireless connection between the wireless transceivers (223 and 227) of the mobile device (203) and the vehicle (201).

Optionally, after the infotainment system (205) determines that the mobile device (203) is a primary user in view of the device list (229), the infotainment system (205) uses the telecommunication device (207) of the vehicle (201) to establish a connection with the server (245) (e.g., via a base station (231) or a satellite (235)) and further establish a connection with the mobile device (203) to allow the mobile application (215) running in the mobile device (203) to regulate the data communication and usage between the server (245) and the infotainment system (205).

Optionally, in response to a determination that the user ID (221) is enrolled in the services of the server (245), the beacon (241) provides an instruction to the mobile device (203), directly or indirectly via the infotainment system (205), to establish a connection with both the infotainment system (205) and the server (245) and request content relevant to an identity/location of the beacon (241).

Based on the identity of the mobile device (203) (and/or the identities of other mobiles in the vehicle (201)), the identity of the location identified by the beacon device (241), and the identity of the vehicle (201), the server (245) may provide customized content for presentation on the infotainment system (205). The presentation can be under the control of the mobile application (215) running in the mobile device (203).

Optionally, a plurality of beacon devices (e.g., 241) are configured at a plurality of locations, such as a location near a pathway for vehicles (e.g., 201), to communicate with vehicles each equipped with a transceiver to communicate with the beacons and an infotainment system that controls the transceiver and has wireless connections to mobile devices of occupants of the vehicle. A computing device (e.g., 245) is positioned remotely from the beacon devices and connected to the beacon devices via a data communication network. When a beacon device detects the presence of a vehicle (e.g., on the pathway), the beacon device communicates with the transceiver of the vehicle to determine an identity of the vehicle on the pathway. Based on the identity of the first vehicle, the computing device determines, via the beacon device communicating with the first vehicle, identification information of at least one mobile device carried in the first vehicle. The computing device then establishes a communication link between the computing device and the vehicle based at least in part on the identification information and the identity of the vehicle.

For example, the mobile device (203) runs a mobile application that is configured to establish a communication connection with the infotainment system (205) of the vehicle (201) and communicate with the beacon device (241), indirectly via the infotainment system (205) or directly, to provide the identification information. After the identification of the identity of the vehicle and the identification information of the occupants of the vehicle, the beacon device (241) instructs, via a wireless connection to the infotainment system, the mobile device (203) to establish the communication link with the computing device (e.g., server (245)) via a wireless communication network. Alternatively, after the identification of the identity of the vehicle and the identification information, the remote computing device (e.g., server (245)) initiates a connection to the mobile application (215) running in the mobile device (203)

to establish a communication link to the vehicle (201) that goes through the mobile device (203) but not the beacon device (241). The mobile application (215) further connects the mobile device (203) to the vehicle (201) and thus bridges the connections between the vehicle (201) and the remote computing device (e.g., server (245)).

While the vehicle (201) is within a communication range from the beacon device (241), the beacon device (241) can be used to bridge a communication connection between the vehicle (201) and the remote computing device (e.g., server (245)). Such a communication connection bridged through the beacon device (241) does not have to go through any of the mobile devices (e.g., 203) of the occupants of the vehicle (201).

When a vehicle (201) has a long range wireless communication device (207) (e.g., a device for cellular communications or satellite communicates), the beacon causes the vehicle (201) to establish the connection to the remote computing device using the long range wireless communication device (207) without using the beacon device (241) and/or any of the mobile devices (e.g., 203) on the vehicle as a bridge.

In one aspect, a method to establish a communication connection includes: providing, at a first location on a pathway for vehicles (e.g., 201), a beacon device (241) connected via a data communication network to a computing device (e.g., server (245) disposed at a second location remote from the first location; detecting, by the beacon device (241), presence of a vehicle (201) on the pathway; communicating by the beacon device (241) with the vehicle (2010 on the pathway; determining, by the beacon device (241), an identity of the vehicle (201) on the pathway; based on the identity of the vehicle (201), determining, by the computing device (e.g., server (245)) via the beacon device communicating with the vehicle (201), identification information of at least one mobile device (203) carried in the vehicle (201); and establishing a communication connection between the computing device (e.g., server (245)) and the vehicle (201) based at least in part on the identification information and the identity of the vehicle (201).

For example, after the communication connection is established, the computing device (e.g., server (245)) can use the communication connection to communicate content relevant to the first location to the vehicle (201). The vehicle (201) then uses its infotainment system (205) to present the content to the audience in the vehicle (201) in a visual and/or audio form.

For example, the content can be selected by the server (245) based on the first location associated with the beacon device (241) and/or the identification information of the occupants of the vehicle (201). In response to suitable content being identified/selected, the communication connection between the computing device and the vehicle is established. In absence of suitable content for presentation to the audience in the vehicle (201), the communication connection between the computing device and the vehicle is not established. The content is selected based on the audience as a whole, meeting the interest of at least some occupants in the vehicle (201) and filtering out content that may be embarrassing and/or inappropriate for any portion of the audience in the vehicle (201).

Optionally, the communication between the beacon device and the infotainment system of the vehicle is at least in part controlled by a mobile application (215) running in a mobile device (203) of an occupant of the vehicle (201). The beacon device (241) transmits an initial signal to the infotainment system to identify the beacon device (241) and/or its location. The mobile application (215) determines whether or not to provide identification information of the vehicle (201) to the beacon device (241). If the identification information of the vehicle (201) is transmitted to the beacon device (241), the beacon device (241) identifies a service for which the vehicle (201) is enrolled. For example, the beacon device (241) communicates with the remote server (245) to determine whether the vehicle (201) is enrolled in the service. Further, the beacon device (241) communicates with the vehicle (201) to identify the occupants of the vehicle based on the wireless signals emitting from the mobile devices (203) of the occupants of the vehicle, such as Bluetooth, WiFi, and/or cellular connection signals. When a mobile device (203) that is detected to be in the vehicle (201) and enrolled in the service, the beacon device (241) may instruct the mobile device (203) to facility the communication connection between the vehicle (201) and the remote computing device (e.g., server (245)) and obtain content relevant to the location/identity of the beacon (241).

Optionally, the beacon device (241) is configured to communicate with the mobile device (203) directly to obtain the identity of the vehicle (201) and/or the user ID (221) stored in the mobile device (203), while the vehicle (201) is within the communication range of the beacon device (241). Subsequently, the beacon on device (241) instructs the mobile application (215) to provide a communication connection between the infotainment system (205) and the remote server (245), or controls the infotainment system (205) via the mobile application (215) to establish a connection with the server (245) using the telecommunication device (207).

Optionally, the transaction data stored by the transaction handler (103) is used in the selection of the content presented on the infotainment system (205).

Access

A vehicle (e.g., a car) can be configured as a selectively presented user interface for interaction with a user of the vehicle based on a status of the vehicle determined based on the sensor data of the vehicle. The vehicle can be further optionally configured as a payment instrument to cause the user interface to be selectively presented based on a payment transaction initiated via the vehicle and processed via an electronic payment processing network.

Some aspects of the vehicle configured as a payment instrument are provided in U.S. patent application Ser. No. 14/932,665, filed Nov. 4, 2015 and entitled "In-Vehicle Access Application", the entire disclosure of which is hereby incorporated herein by reference.

Based on the operating status of the vehicle, messages (e.g., offers and promotions) are transmitted to and/or presented via an infotainment system of the vehicle. For example, offers can be selected based on the current location of the vehicle. For example, an offer can be transmitted to the vehicle when the vehicle is entering a predefined region, leaving a predefined region, traveling within a predefined region, or being operated at a predetermined operating state of the vehicle within a predefined region. Optionally, the offer is further selected for transmission to the vehicle based on a transaction profile of one or more occupants (e.g., the passengers and/or the driver) of the vehicle.

A data connection to the vehicle can be established in a way as discussed in connection with FIGS. 1 and 2.

Optionally, the offers are highly individualized and/or customized for the occupants of a vehicle, based on both the identity of the vehicle and the identities of the occupants indicated by the mobile devices carried by the occupants. The offers are communicated to the occupants through the vehicle and/or the mobile devices, in view of the operating status of the vehicle and/or the status of the occupants in relation with the vehicle (e.g., whether an occupant is currently a driver or a passenger). Some techniques to individualize and/or customize a message/offer based on the transaction data of one or more persons can be found in U.S. Pat. Nos. 8,606,630, 8,744,906, and 8,626,579, the disclosures of which are hereby incorporated herein by reference.

For example, a targeted message can be communicated to the vehicle when the vehicle carries a person as a passenger who is selected for the targeted message, but the message is not transmitted if the person is the driver.

For example, a targeted message can be communicated to the mobile device of a passenger (with or without going through the infotainment system of the vehicle), but not the mobile device of the driver.

For example, a targeted message can be transmitted to a vehicle at a first phase of a trip of the vehicle based on the location of the vehicle, the identity of the vehicle, the identity of at least one occupant of the vehicle, and the transaction data of the occupant. The target message is presented via the infotainment system of the vehicle and/or a mobile device of the occupant when the vehicle is determined to be in a second phase of the travel, based on the sensor data of the vehicle and/or the location of the vehicle.

A centralized database can be configured to store the profiles and spending propensity information of users of payment instruments. The profiles and spending propensity information of users can be computed from the transaction data of users, e.g., using the techniques disclosed in U.S. Pat. Nos. 8,606,630, 8,744,906, and 8,626,579. The centralized database stores attributes of merchants and geolocation information for mapping a location of vehicle (e.g., longitude and latitude coordinates of the vehicle determined by a position determination device of the vehicle) to a predefined region (e.g., city, state, area identified by a zip code, or other types of regions defined by a predetermined boundary). A server is configured to communicate with the vehicle to identify the occupants of the vehicle and establish a data connection with the vehicle and/or the mobile devices of the occupants of the vehicle (e.g., in a way as illustrated in FIGS. 1 and 2). The data connection is used to communicate a message individualized and/or customized based on the location of the vehicle and/or the profiles and spending propensity information of the occupants of the vehicle. Preferably, the communication and/or the presentation of the message is based at least in part on the sensor data indicating the operating status of the vehicle, such as the engine control signals, brake control signals, etc.

After an offer is presented to a user and/or accepted by the user, the offer can be stored in the centralized database in association with the payment accounts of the occupants. When the payment instrument configured on the vehicle is used to make a payment that satisfies the benefit redemption requirement of the offer, the benefit of the offer is provided to the corresponding payment account by the electronic payment processing network in an automated way. Examples of techniques to provide the benefit of an offer associated with a payment account can be found in U.S. Pat. Nos. 8,407,148 and 8,359,274 and U.S. Pat. App. Pub. Nos. 2013/0091000, 2013/0124287, 2013/0246150, 2013/0268333, 2013/0282461, 2014/0222533, and 2015/0134528, the entire disclosures of which patents/applications are hereby incorporated herein by reference.

An offer may include the accumulation of a loyalty currency in a loyalty account associated with a payment account of a user. The loyalty currency, for example, can be in the form of points, miles, virtual currency, etc. The loyalty currency can be redeemed in subsequent purchases/payment transactions. Examples of technologies related to the processing of loyalty currency redemption can be found in U.S. Pat. App. Pub. Nos. 2013/0282461, 2013/0325579, 2014/0172534, 2015/0088633, 2015/0088626, 2015/0120429, 2015/0149272, 2015/0262177, and 2015/0363810, the entire disclosures of which applications are hereby incorporated herein by reference.

Figure 3:
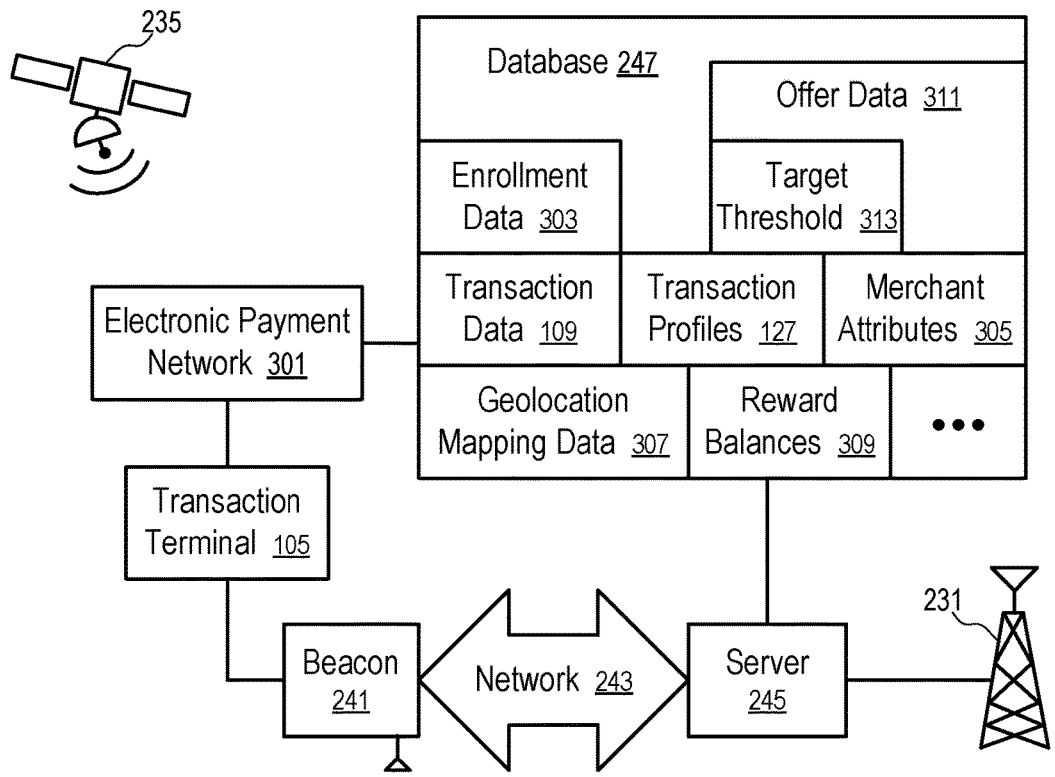
FIG. 3 shows a system configured to provide services to a vehicle.
Figure 3:
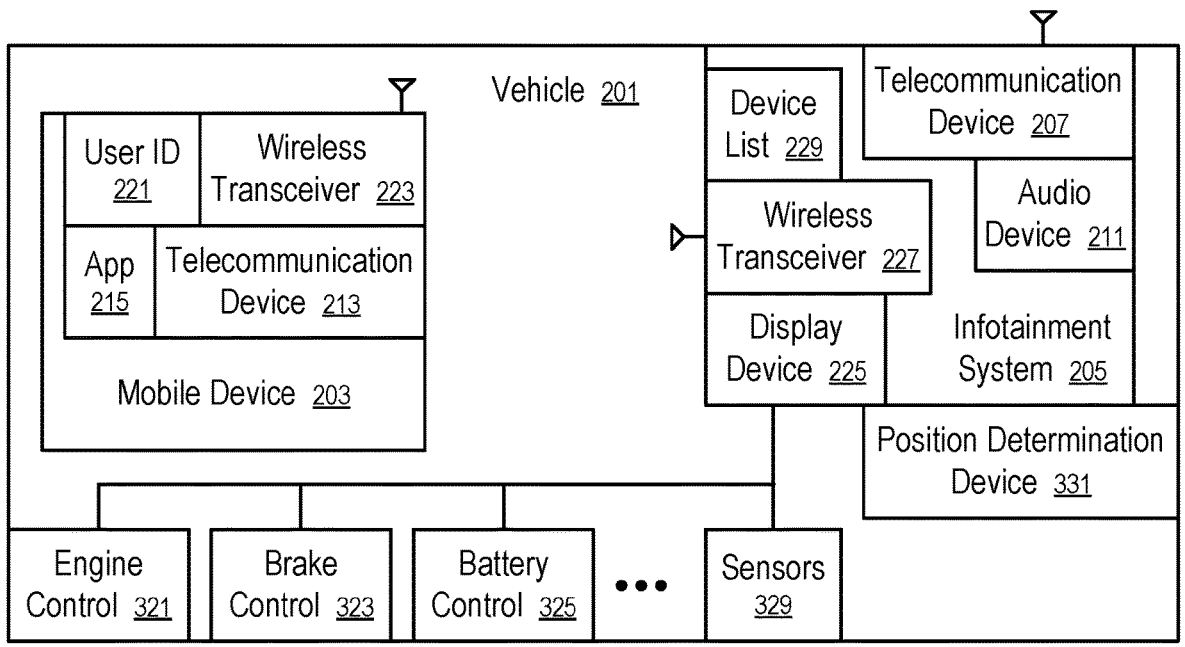

FIG. 3 shows a system configured to provide services to a vehicle.

In FIG. 3, the vehicle (201) is configured to establish a data connection with the server (245) in a way as discussed above in connection with FIGS. 1 and 2.

In FIG. 3, the infotainment system (205) of the vehicle (201) is configured to obtain the current location of the vehicle (201) from the position determination device (331) (e.g., a GPS receiver) configured as part of the navigation system of the vehicle (201) and/or from a position determination device in the mobile device (203) carried by an occupant of the vehicle (201).

Further in FIG. 3, the infotainment system (205) of the vehicle (201) is configured to obtain sensor measurement data from the sensors (329), indicative of the operational status of various components of the vehicle (201), such as the engine control (321), the brake control (323), the battery control (325), and others (e.g., cruise control, autonomous driving control).

For example, a user of a payment account (146) with the vehicle (201) is provided with a user interface on the vehicle (201), a mobile device (203) of the user, and/or a server (245) of the system, to enroll in a loyalty program. The server (245) stores the enrollment data (303) in the database (247) to identify a subset of the users having payment accounts with the electronic payment network (301) that are registered users of the loyalty program.

Upon enrollment, the profile/spending propensity information of the user (e.g., transaction profile (127)), is computed based on the past transaction data (109) of the user in the payment account (146) and stored in the database (247) as a repository of transaction profiles (127). The profile information is updated in view of recently transactions made in the payment account (146) of the user and/or via the vehicle (201) of the user as a payment instrument.

A merchant user interface provided on the server (245) is configured to allow merchants to set up offers, by specifying aspects such as a targeted geographical region, required attributes of profiles of users participated in the loyalty program, details of benefits/award/discounts/coupons, and other terms and conditions. The targeted region may be a city, a state, an area corresponding to a postal/zip code, a predefined commercial district, a shopping mall, or a region identified by drawing a closed boundary of a regular or irregular shape on a digital map presented on the user interface.

Optionally, the system is configured to selectively communicate the offers to the qualified users based on the locations of their vehicles, the operating statuses of the vehicles, occupant information and their roles in the vehicles, and/or other information.

For example, the vehicle (201) is configured to determine, at a predetermined interval after an activation of a tracking operation, the latitude and longitude coordinates of the current location of the vehicle (201), the presence information of occupants registered in the loyalty program in the vehicle (201) (e.g., as indicated by the presence of the mobile devices of the users), the roles of the registered occupants of the vehicle (201) (e.g., based on whether a user is in the driver seat, an estimation of a position of the mobile device of the user in the vehicle (201) via the wireless communication signals, and/or driver seat configuration preference setting and current driver seat position), the states of registered mobile devices of the registered occupants of the vehicle (201) (e.g., whether the mobile device is currently being used by a user or in a standby mode, whether a specific mobile application is currently running in the mobile device or not, whether or not the mobile application is in a specific mode), the operation status of the vehicle (e.g., whether the vehicle (201) is transitioning from a parked mode to a driving mode, whether the vehicle (201) is currently being parked, whether the vehicle (201) is in a cruise control mode, whether the vehicle (201) is in an autonomous driving mode), etc. When the determined information meets a predetermined requirement, the vehicle (201) is configured to transmit at least a portion of the determined information to the server (245) via a data connection (e.g., as established in a way as discussed in connection with FIGS. 1 and 2). Preferably, the information transmitted to the sever (245) include an identifier of the vehicle (201) and one or more identifiers of the registered occupants (e.g., user ID (221)).

The server (245) is configured to map the latitude and longitude coordinates of the current location of the vehicle (201) into various geographical regions of the offers specified by the merchants, based on the geolocation mapping data (307).

Optionally, to improve the computational efficiency when the targeted regions of the merchants are not in the form of standardized geographical regions, the system is configured to use a threshold distance to first identify selected merchants that are within the threshold distance from the center of the targeted regions, and then determine whether the current location of the vehicle (201) is within the targeted regions of the selected merchants. Examples of standardized geographical regions are cities, states, areas identified by postal/zip codes.

Optionally, to further improve the computational efficiency in matching the merchant offers and registered users of the loyalty program, the server (245) organizes the requirements of offers into a first category of requirements of user attributes that do not change frequently, such as transaction profile attributes, which is periodically updated (e.g., once a week, a month, a quarter, or a year), and a second category of requirements of user attributes that do change frequently, such as the location of the vehicle (201) of the user. The requirements in the first category are valuated first to pre-filter the users such that the requirements in the second category are not evaluated for the users whose do not meeting the requirements in the first category.

Optionally, the system is configured to compute different update frequencies/time periods for different requirements of the offers. The information about the users is used to pre-qualify the users for the offers for the update frequencies/time periods, reducing the computational load of the server (245) in evaluation the requirements of the offers relative to the current information of the users.

Optionally, the system is further configured to dynamically adjust the update frequency/time period for the evaluation of the location of the vehicle (201) of a user relative to the targeted regions of the merchants, based on the current travel speed of the user, the predicted travel route of the user, etc. Some techniques to predict the travel route of a user and/or select points of interest based on the travel route can be found in U.S. Pat. App. Pub. Nos. 2014/0136104, 2014/0172576, 2014/0213300, 2015/0264532, the entire disclosures of which applications are hereby incorporated herein by reference.

After the server (245) identifies merchant offers that have conditions satisfied by one or more occupants of the vehicle (201), the server (245) communicates the offers to the vehicle (201) for presentation to the occupants. For example, the offers can be presented via the infotainment system of the vehicle (201) via visual display and/or audio playback. For example, the offers can be transmitted from the vehicle (201) via a wireless connection (e.g., Bluetooth or WiFi) to mobile devices of the user. Preferably, the vehicle (201) is configured to determine a timing and a channel to present the offers based on the current location of the vehicle (201) (e.g., whether the vehicle (201) is approaching a location of a merchant, whether the vehicle (201) is approaching a destination location identified in the navigation system of the vehicle (201)), the current vehicle operating status (e.g., when the vehicle (201) transits from a driving mode to a parking mode, when the fuel level of the vehicle (201) is below a threshold, when the vehicle (201) is under cruise control, when the vehicle (201) is in an autonomous driving mode) and/or the state of the mobile devices (e.g., when a mobile device is current being used by a user, when a mobile device is running a specific mobile application, when a mobile application is in a specific mode).

Optionally, an application configured in an infotainment system (205) of the vehicle (201) and/or a mobile application (215) installed in a mobile device (203) has an offer wall to present the offers. The offer wall is a user interface configured to determine relevancy of the offers and present the offers (e.g., based on priority indicated by the server (245) and/or additional information and/or preferences available at the application but not necessarily accessible to the server (245)). The offers presented on the offer walls are dynamically arranged according to relevancy levels of the offers and/or user interactions with the offers. Preferably, the offer wall is updated at suitable intervals as the vehicle (201) travels.

An offer transmitted to the vehicle (201) can be automatically configured for automated benefit redemption, in response to a payment account associated with the vehicle (201) being used in making a payment transaction that satisfies the benefit redemption requirements of the respective offer. Alternatively, the offer is configured for automated benefit redemption after the offer is presented on the offer wall via the infotainment system and/or the mobile device of the user. Optionally, a user confirmation to accept the offer on the offer wall is required to configure the offer for automated benefit redemption.

During automated benefit redemption, in response to a payment account associated with the vehicle (201) being used in making a payment transaction that satisfies the benefit redemption requirements of the respective offer, the system is configured to provide the benefit as a reduced transaction amount in the payment account, a statement credit provided to the payment account upon the settlement of the payment transaction, and/or an amount of loyalty currency added to a loyalty account associated with the payment account. For example, in FIG. 3, the database (247) further stores the reward balances (309) of the loyalty accounts of the registered users of the loyalty program.

In FIG. 3, the database (247) stores merchant attributes (305) to associate identifies of the merchants identified in the offer data (311) with the corresponding merchants identified in the transaction data (109). Examples of techniques to establish associations between merchants identified in the offer data (311) with the corresponding merchants identified in the transaction data (109) can be found in U.S. Pat. Nos. 9,159,084, and 8,706,557, and U.S. Pat. App. Pub. Nos. 2015/0356556 and 2015-0356690, the entire disclosures of which patents/applications are hereby incorporated herein by reference.

An offer of a merchant can be transmitted to qualified vehicles (e.g., 201) in response to a count of the qualified vehicles in a targeted geographical region is above a threshold (313). When the count is below a threshold (313), the offer is not distributed.

For example, the user interface of the server (245) allows a merchant to specify the threshold (313) for the offer identified by the offer data (311). The system monitors the current count of the qualified vehicles (e.g., 201); and in response to the count is above the threshold (313), the system communicates the offer to the set of currently qualified vehicles.

Optionally, the system is configured to report the current count of the qualified vehicles in the targeted region in real time via a user interface presented via the server (245), or a mobile application running in a mobile device of the merchant. The report of the current count assists the merchant in selecting the threshold (313).

Optionally, in response to the current count of the qualified vehicles being above a threshold (313), the system provides a notification to the merchant. In response, the merchant may provide an instruction to distribute the offer in real time, or ignore the notification to prevent the offer being distributed at that time.

Optionally, the user interface and/or the mobile application for the merchant is further configured to present a distribution of qualified vehicles in an area on a digital map. For example, each qualified vehicle may be shown as a dot or an icon on the digital map. Alternatively, icons representing different groups of vehicles in approximate locations of the vehicles can be shown on the digital map with indications of the sizes of the groups. The size indications can be in the form of numbers attached to the icons, colors or sizes of the icons, etc.

In some instances, the loyalty currencies can be redeemed as offers from the merchants.

Optionally, a payment transaction is required to be made via the vehicle (201) as a payment instrument (with or without the participation of a mobile device of an occupant of the vehicle (201)) in order to satisfy the benefit redemption requirement of an offer. Some techniques of configuring a vehicle (201) as a payment instrument are disclosed in U.S. patent application Ser. No. 14/932,665, filed Nov. 4, 2015, the entire disclosure of which application is hereby incorporated herein by reference.

Figure 4:
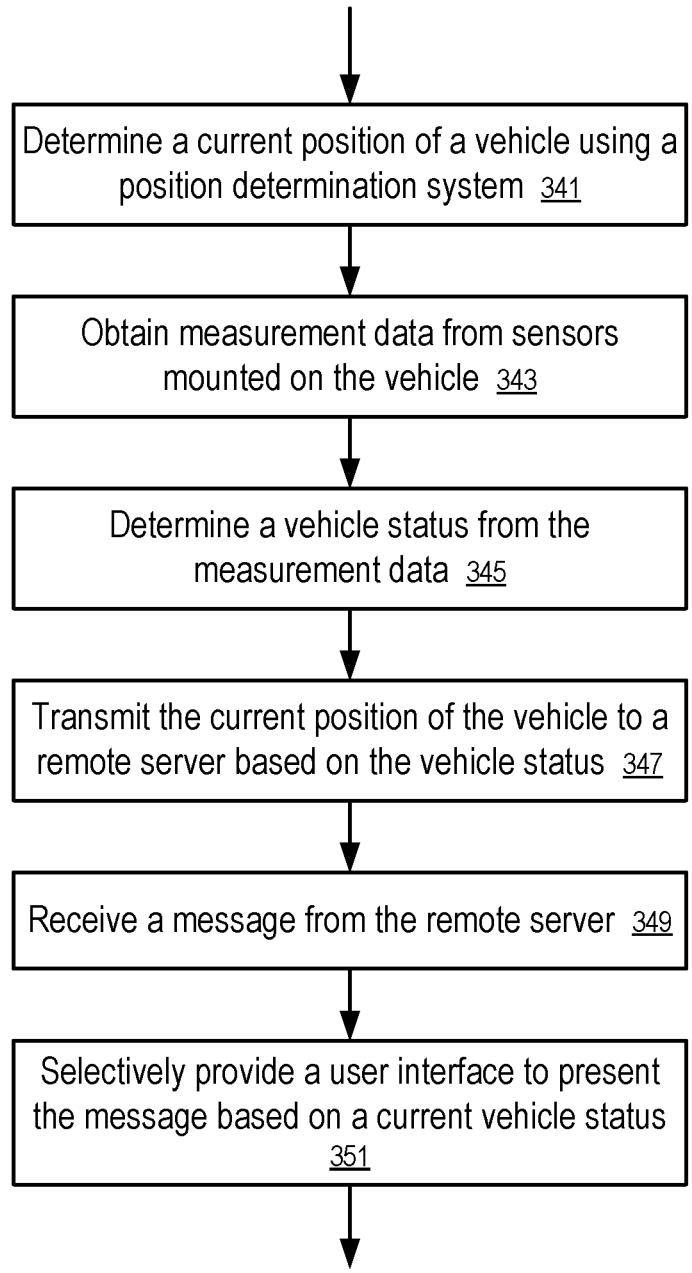
FIG. 4 shows a method to access services in a vehicle.

FIG. 4 shows a method to access services in a vehicle. For example, the method of FIG. 4 can be implemented in a system of FIG. 3.

In FIG. 4, a computing system of a vehicle (201) is configured to: determine (341) a current position of the vehicle (201) using a position determination system (e.g., 235); obtain (343) measurement data from sensors (329) mounted on the vehicle (201); determine (345) a vehicle status from the measurement data; transmit (347) the current position of the vehicle (201) to a remote server (245) based on the vehicle status; receive (349) a message from the remote server (245); and selectively (351) provide a user interface to present the message based on a current vehicle status.

For example, a computing device configured on a vehicle (201) includes: a set of sensors (329) mounted on the vehicle (201); at least one microprocessor (173); a wireless communication device (227); and a memory (167) storing instructions which when executed by the at least one microprocessor (173) cause the computing device to a method disclosed herein.

For example, the computing device is configured to: obtain first measurement data from the sensors (329) mounted on the vehicle (201); and determine a first vehicle status from the first measurement data. In response to the first vehicle status, the computing device determines a position of the vehicle (201) using a position determination system and transmits to a remote server (245) using the wireless communication device (227), a communication identifying the position of the vehicle (201). As a response to transmitting of the communication to the remote server (245), the computing device receives a message from the remote server (245) and stores the message for presentation when the vehicle (201) is has a second vehicle status. Subsequent, the computing device obtains second measurement data from the sensors (329) mounted on the vehicle (201) and determines the second vehicle status from the second measurement data; and in response, the computing device provides a user interface presenting the message.

The computing device may optionally include a wireless transceiver (227) configured via the instructions to determine an identity of an occupant of the vehicle (201) based on wireless signals emitted from a mobile device (203) of the occupant (e.g., with or without actually making a communication connection with the mobile device (203) of the occupant).

The computing device may optionally include an infotainment system (205) configured via the instructions to provide the user interface.

The computing device may optionally include a position determination device (331) configured to determine the position of the vehicle (201) using the position determination system (235). In some instances, the mobile device (203) determines its location and communicates its location via the wireless connection between the wireless transceiver (223) of the mobile device (203) and the wireless transceiver (227) of the computing device of the vehicle (201).

Optionally, the communication transmitted from the vehicle (201) to the server (245) further identifies an identity of an occupant of the vehicle (201) and/or a role of the occupant of the vehicle (201). The communication connection between the vehicle (201) and the server (245) can be established using the techniques of FIG. 1 or 2.

Optionally, the computing device is configured to periodically communicate to the remote server (245) updates of the current position of the vehicle (201). The frequency of the updates can be determined based on a location of the vehicle (201) relative to a set of locations of interest, a speed of the vehicle (201), and/or a predicted travel route of the vehicle (201).

Optionally, the message is transmitted from the remote server (201) to the vehicle (201) in response to a current count of vehicles that are qualified to receive the message being above a threshold (313).

For example, the remote server (245) can be configured to communicate, to a mobile apparatus of a merchant, the current count of the vehicles (e.g., 201) that are qualified to receive the message, where the threshold (313) is adjustable via a communication from the mobile apparatus of the merchant.

Further, the remote server (245) can be configured to present current locations of the vehicles (e.g., 201) that are qualified to receive the message on a digital map presented on the mobile apparatus of the merchant. Thus, the merchant may provide a real time instruction from the mobile apparatus to cause the remote server (245) to broadcast or transmit the message to the vehicles that are qualified to receive the message.

Optionally, the vehicles (e.g., 201) that are determined to be qualified to receive the message are identified based at least in part on the current locations of the vehicles (e.g., 201) and/or the transaction profiles (127) of occupants of the vehicles (e.g., 201).

In some instances, the user interface is provided via an application running on the mobile device (203) of the occupant of the vehicle (201). In other instances, the user interface is provided via an infotainment system (331) of the vehicle (201).

Optionally, the computing device of the vehicle (201) monitors a status of the application of the mobile device (203) and presents the message via the application when the application of the mobile device is in a predetermined mode.

Applications of Transaction Data

Transaction data, such as records of transactions made via credit accounts, debit accounts, prepaid accounts, bank accounts, stored value accounts and the like, can be processed to provide information for various services, such as reporting, benchmarking, advertising, content or offer selection, customization, personalization, prioritization, etc.

For example, an advertising network is provided based on a transaction handler to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers.

For improved privacy protections, users may be required to enroll in a service program and provide consent to allow the system to use related transaction data and/or other data for the related services, and the system is configured to provide the services while protecting the privacy of the users in accordance with the enrollment agreement and user consent.

For example, a computing apparatus may correlate transactions with activities that occurred outside the context of the transaction, such as online advertisements presented to the customers that at least in part cause the offline transactions. The correlation data can be used to demonstrate the success of the advertisements, and/or to improve intelligence information about how individual customers and/or various types or groups of customers respond to the advertisements.

For example, the computing apparatus correlates, or provides information to facilitate the correlation of, transactions with online activities of the customers, such as searching, web browsing, social networking and consuming advertisements, with other activities, such as watching television programs, and/or with events, such as meetings, announcements, natural disasters, accidents, news announcements, etc.

The correlation results can be used in predictive models to predict transactions and/or spending patterns based on activities or events, to predict activities or events based on transactions or spending patterns, to provide alerts or reports, etc.

A single entity operating the transaction handler may perform various operations in the services provided based on the transaction data. For example, in the presentation of the personalized or targeted advertisements, the single entity may perform the operations such as generating the intelligence information, selecting relevant intelligence information for a given audience, selecting, identifying, adjusting, prioritizing, personalizing and/or generating advertisements based on selected relevant intelligence information, and facilitating the delivery of personalized or targeted advertisements, etc. Alternatively, the entity operating the transaction handler cooperates with one or more other entities by providing information to these entities to allow these entities to perform at least some of the operations for presentation of the personalized or targeted advertisements.

For example, an enhanced information and/or advertisement delivery capability can be provided at a point of interaction that is associated with user transaction interactions, such as point of sale (POS) terminals, Automatic Teller Machines (ATMs), mobile phones, account statements, receipts, websites, portals, etc. The transactions are processed by a transaction handler for various different merchants, retail stores, and online marketplaces that offer various different products and services. The enhanced advertisement delivery capability enables advertisers and merchants to identify and reach their target audience in connection with transactions and to increase their advertisement scale through new media channels.

Optionally, the information and/or advertisement can be delivered to a "white space" available on a point of interaction that is used to present transaction related information to a user. For example, the transaction information presented to the user can be an authorization code for a payment transaction processed by a transaction handler, a statement about the transaction, a receipt for the transaction, a confirmation request for the transaction, a signature request for the transaction, etc. The white space is a portion of the media channel for the communication of the transaction related information, which portion might be left blank and can be used for the presentation of the advertisement. Details about the point of interaction and the white space of some examples are provided in the section entitled "POINT OF INTERACTION."

The information and/or advertisement can be identified, generated, selected, prioritized, adjusted, customized, and/or personalized to target the user associated with the transaction, to whom the transaction related information is presented on the point of interaction. The targeting may be based on intelligence information about the user generated at least in part from the transaction data recorded by the transaction handler. For example, the transaction data, and/or the information, such as account data, merchant data, etc. can be used to generate a transaction profile of the user, which is used for the targeting of the information or advertisement.

Optionally, a user specific profile is selected or calculated in real time for the user involved in the transaction, to whom the transaction related information is presented on the point of interaction. The user specific profile may describe the customer at varying levels of specificity. Based on the user specific profile, a targeted advertisement is selected, generated, customized, prioritized and/or adjusted in real time for presentation to the customer with the transaction related information, as discussed in more detail below.

Transaction-Based System

Figure 5:
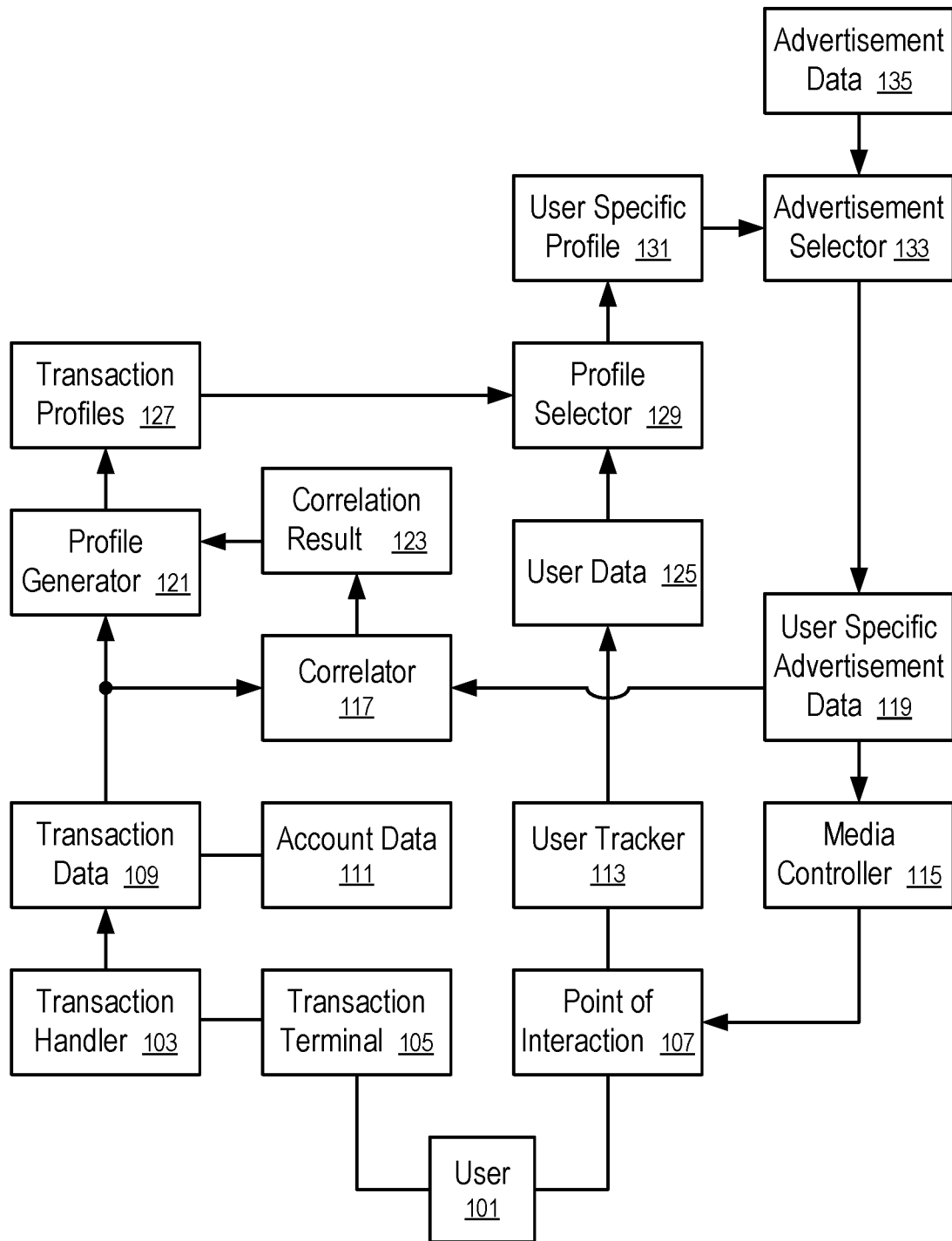
FIG. 5 illustrates a system to provide services based on transaction data.

FIG. 5 illustrates a system to provide services based on transaction data. For example, the systems of FIGS. 1 and 3 can be improved using the techniques of FIG. 5. In FIG. 5, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller 115).

The system of FIG. 5 further includes a correlator (117) to correlate user specific advertisement data (119) with transactions resulting from the user specific advertisement data (119). The correlation results (123) can be used by the profile generator (121) to improve the transaction profiles (127).

The transaction profiles (127) are generated from the transaction data (109). For example, an aggregated spending profile is generated via the factor analysis and cluster analysis to summarize the spending patterns/behaviors reflected in the transaction records.

Figure 6:
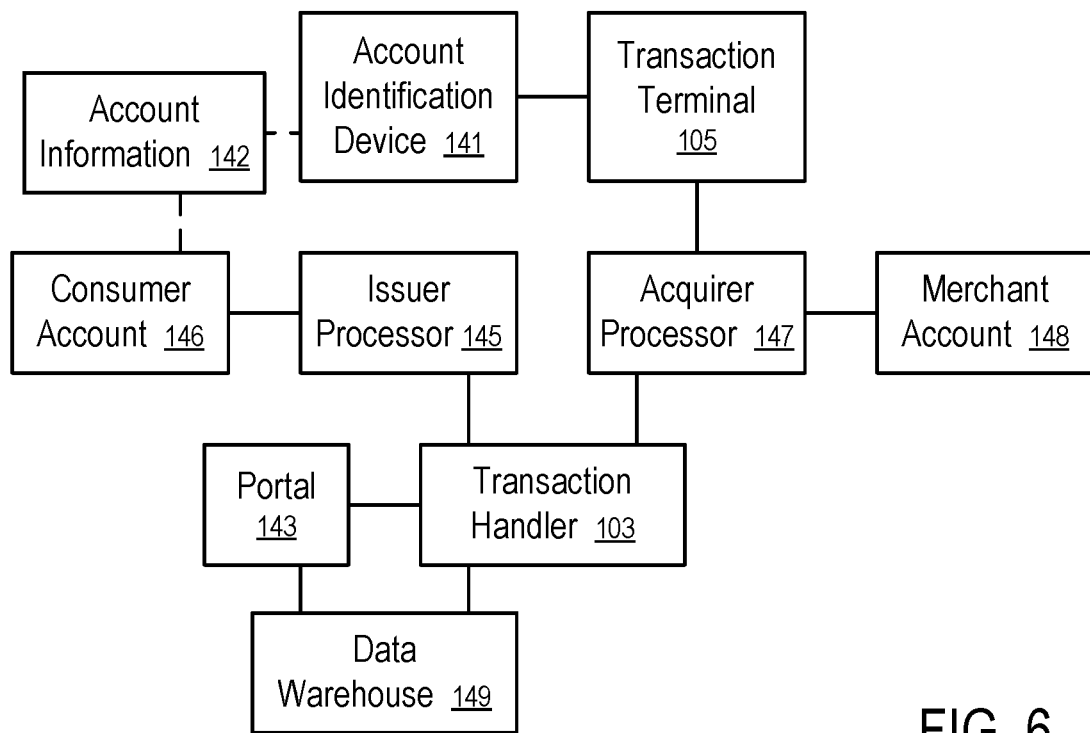
FIG. 6 shows a system to provide information based on transaction data.

A data warehouse (149) as illustrated in FIG. 6 is coupled with the transaction handler (103) to store the transaction data (109) and other data, such as account data (111), transaction profiles (127) and correlation results (123). In FIG. 6, a portal (143) is coupled with the data warehouse (149) to provide data or information derived from the transaction data (109), in response to a query request from a third party or as an alert or notification message.

FIG. 6 illustrates an example of an electronic payment processing network (301), where the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 7:
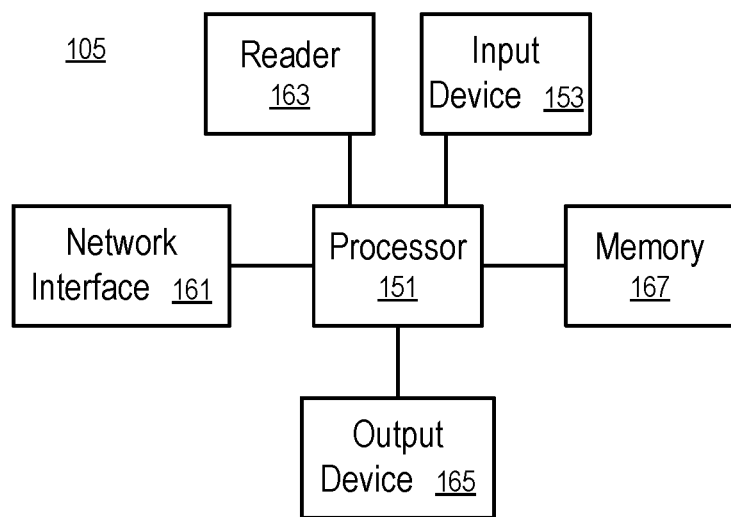
FIG. 7 illustrates a transaction terminal.
Figure 8:
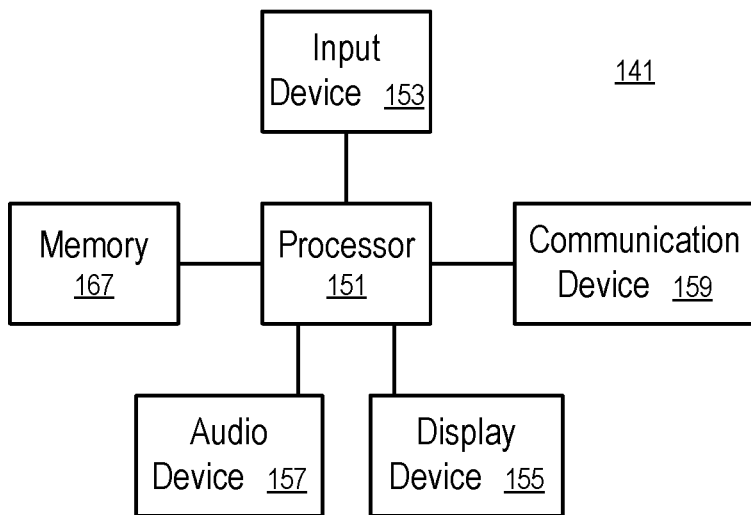
FIG. 8 illustrates an account identifying device.
Figure 9:
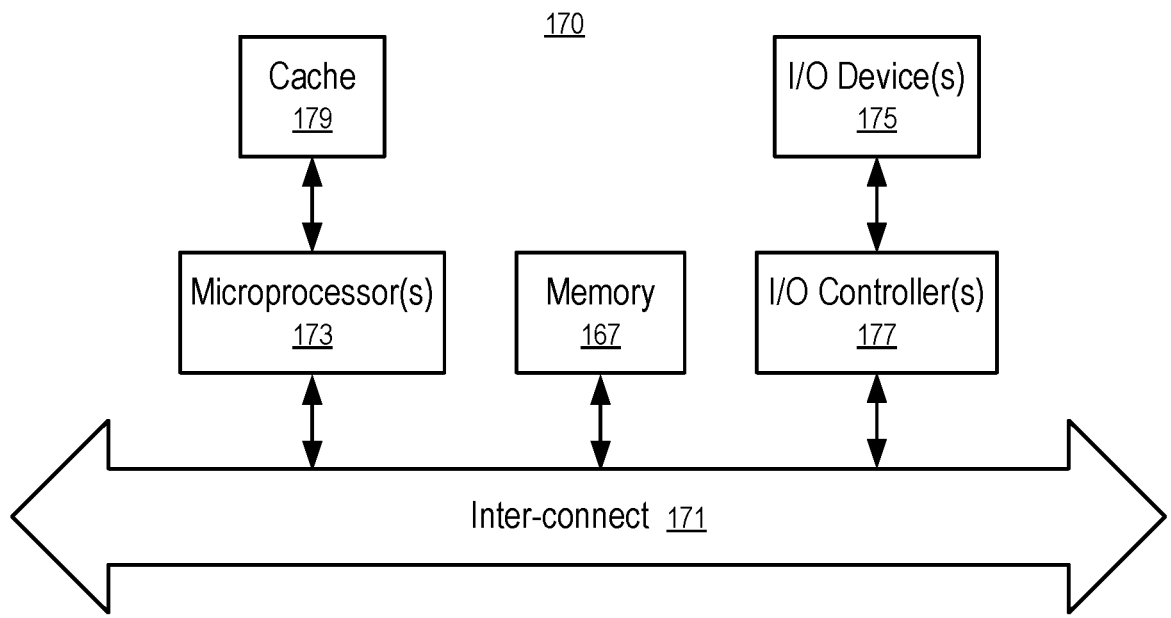
FIG. 9 illustrates a data processing system.

FIGS. 7 and 8 illustrate examples of transaction terminals (105) and account identification devices (141). FIG. 9 illustrates the structure of a data processing system that can be used to implement, with more or fewer elements, at least some of the components in the system, such as the beacon (241), the server (245), the mobile device (203), the infotainment system (205), the point of interaction (107), the database (247), the transaction handler (103), the portal (143), the data warehouse (149), the account identification device (141), the transaction terminal (105), the user tracker (113), the profile generator (121), the profile selector (129), the advertisement selector (133), the media controller (115), etc.

Typically, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

The financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). Optionally, the financial transactions can be made via directly using the account information (142), without physically presenting the account identification device (141).

The transaction handler (103) typically maintains a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section.

The centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

The centralized data warehouse (149) may store merchant data (e.g., data about sellers), customer/business data (e.g., data about buyers), and transaction records between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

Optionally, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

In FIG. 5, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. Pat. Pub. No. 2011/0054981, "Analyzing Local Non-Transactional Data with Transactional Data in Predictive Models," the disclosure of which is hereby incorporated herein by reference.

The transaction profiles (127) provide intelligence information on the behavior, pattern, preference, propensity, tendency, frequency, trend, and budget of the user (101) in making purchases. The transaction profiles (127) may include information about what the user (101) owns, such as points, miles, or other rewards currency, available credit, and received offers, such as coupons loaded into the accounts of the user (101). The transaction profiles (127) may include information based on past offer/coupon redemption patterns. The transaction profiles (127) may include information on shopping patterns in retail stores as well as online, including frequency of shopping, amount spent in each shopping trip, distance of merchant location (retail) from the address of the account holder(s), etc.

The transaction handler (103) provides at least part of the intelligence for the prioritization, generation, selection, customization and/or adjustment of the advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

The profile generator (121) generates and updates the transaction profiles (127) in batch mode periodically. Alternatively, the profile generator (121) generates the transaction profiles (127) in real time, or just in time, in response to a request received in the portal (143) for such profiles.

The transaction profiles (127) may include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Some details and examples about the transaction profiles (127) are provided in U.S. Pat. App. Pub. No. 2010/0306029, entitled "Cardholder Clusters" and "U.S. Pat. App. Pub. No. 2010/0306032, entitled "Systems and Methods to Summarize Transaction Data", the entire disclosures of which applications are hereby incorporated herein by reference.

The transaction data (109) can be analyzed in connection with non-transactional data to generate transaction profiles (127) and/or to make predictive models.

For example, transactions can be correlated with non-transactional events, such as news, conferences, shows, announcements, market changes, natural disasters, etc. to establish cause and effect relations to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

When the cause and effect relationships between the transactions and non-transactional events are known (e.g., based on prior research results, domain knowledge, expertise), the relationships can be used in predictive models to predict future transactions or spending patterns, based on events that occurred recently or are happening in real time.

The non-transactional data may relate to events that happened in a geographical area local to the user (101) that performed the respective transactions. A geographical area is local to the user (101) when the distance from the user (101) to locations in the geographical area is within a convenient range for daily or regular travel, such as 20, 50 or 100 miles from an address of the user (101), or within the same city or zip code area of an address of the user (101). Some examples of analyses of local non-transactional data in connection with transaction data (109) are provided in U.S. Pat. Pub. No. 2011/0054981, entitled "Analyzing Local Non-Transactional Data with Transactional Data in Predictive Models," the disclosure of which is hereby incorporated herein by reference.

The non-transactional data may not be limited to local non-transactional data. For example, national non-transactional data can also be used.

The transaction records can be analyzed in frequency domain to identify periodic features in spending events. The periodic features in the past transaction records can be used to predict the probability of a time window in which a similar transaction would occur. For example, the analysis of the transaction data (109) can be used to predict when a next transaction having the periodic feature would occur, with which merchant, the probability of a repeated transaction with a certain amount, the probability of exception, the opportunity to provide an advertisement or offer such as a coupon, etc. The periodic features are detected through counting the number of occurrences of pairs of transactions that occurred within a set of predetermined time intervals and separating the transaction pairs based on the time intervals. Some examples and techniques for the prediction of future transactions based on the detection of periodic features are provided in U.S. Pat. App. Pub. No. 2010/0280882, entitled "Frequency-Based Transaction Prediction and Processing," the disclosure of which is hereby incorporated herein by reference.

Some techniques and details of predictive modeling can be found in U.S. Pat. Nos. 6,119,103, 6,018,723, 6,658,393, 6,598,030, and 7,227,950, the disclosures of which are hereby incorporated herein by reference.

Optionally, offers are based on the point-of-service to offeree distance to allow the user (101) to obtain in-person services. For example, the offers are selected based on transaction history and shopping patterns in the transaction data (109) and/or the distance between the user (101) and the merchant. Offers may be provided in response to a request from the user (101), or in response to a detection of the location of the user (101). Some examples and details can be found in U.S. Pat. Pub. No. 2008/0319843, entitled "Supply of Requested Offer Based on Point-of Service to Offeree Distance," U.S. Pat. Pub. No. 2008/0300973, entitled "Supply of Requested Offer Based on Offeree Transaction History," U.S. Pat. App. Pub. No. 2009/0076896, entitled "Merchant Supplied Offer to a Consumer within a Predetermined Distance," U.S. Pat. App. Pub. No. 2009/0076925, entitled "Offeree Requested Offer Based on Point-of Service to Offeree Distance," and U.S. Pat. App. Pub. No. 2010/0274627, entitled "Receiving an Announcement Triggered by Location Data," the disclosures of which applications are hereby incorporated herein by reference.

In FIG. 5, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

The user data (125) typically includes the characterization of the context at the point of interaction (107). Thus, the use of the user specific profile (131), selected using the user data (125), includes the consideration of the context at the point of interaction (107) in selecting the user specific advertisement data (119).

In selecting the user specific advertisement data (119), the advertisement selector (133) uses not only the user specific profile (131), but also information regarding the context at the point of interaction (107). For example, the user data (125) includes information regarding the context at the point of interaction (107); and the advertisement selector (133) explicitly uses the context information in the generation or selection of the user specific advertisement data (119).

The advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

The queries communicated from the advertisement selector (133) may request intelligence information regarding the user (101) at any level of specificity (e.g., segment level, individual level). For example, the queries may include a request for a certain field or type of information in a cardholder's aggregate spending profile. As another example, the queries may include a request for the spending level of the user (101) in a certain merchant category over a prior time period (e.g., six months).

The advertisement selector (133) may be operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist the customization of the user specific advertisement data (119).

Advertising can be targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

The aggregated spending profile is used to provide intelligence information about the spending patterns, preferences, and/or trends of the user (101). For example, a predictive model can be established based on the aggregated spending profile to estimate the needs of the user (101). For example, the factor values and/or the cluster ID in the aggregated spending profile can be used to determine the spending preferences of the user (101). For example, the channel distribution in the aggregated spending profile can be used to provide a customized offer targeted for a particular channel, based on the spending patterns of the user (101).

Mobile advertisements, such as offers and coupons, are generated and disseminated based on aspects of prior purchases, such as timing, location, and nature of the purchases, etc. For example, the size of the benefit of the offer or coupon is based on purchase volume or spending amount of the prior purchase and/or the subsequent purchase that may qualify for the redemption of the offer. Some details and examples can be found in U.S. Pat. Pub. No. 2008/0201226, entitled "Mobile Coupon Method and Portable Consumer Device for Utilizing Same," the disclosure of which is hereby incorporated herein by reference.

When conditional rewards are provided to the user (101), the transaction handler (103) monitors the transactions of the user (101) to identify redeemable rewards that have satisfied the respective conditions. The conditional rewards can be selected based on transaction data (109). Some details and examples of conditional rewards can be found in U.S. Pat. App. Pub. No. 2008/0082418, entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Some details about targeted offer delivery are provided in U.S. Pat. App. Pub. No. 2010/0030644, entitled "Targeted Advertising by Payment Processor History of Cashless Acquired Merchant Transaction on Issued Consumer Account," and in U.S. Pat. App. Pub. No. 2011/0035280, entitled "Systems and Methods for Targeted Advertisement Delivery", the disclosures of which applications are hereby incorporated herein by reference.

In FIG. 5, the user tracker (113) obtains and generates context information about the user (101) at the point of interaction (107), including user data (125) that characterizes and/or identifies the user (101). The profile selector (129) selects a user specific profile (131) from the set of transaction profiles (127) generated by the profile generator (121), based on matching the characteristics of the transaction profiles (127) and the characteristics of the user data (125). For example, the user data (125) indicates a set of characteristics of the user (101); and the profile selector (129) selects the user specific profile (131) that is for a particular user or a group of users and that best matches the set of characteristics specified by the user data (125).

Optionally, the profile selector (129) receives the transaction profiles (127) in a batch mode. The profile selector (129) selects the user specific profile (131) from the batch of transaction profiles (127) based on the user data (125). Alternatively, the profile generator (121) generates the transaction profiles (127) in real time; and the profile selector (129) uses the user data (125) to query the profile generator (121) to generate the user specific profile (131) in real time, or just in time. The profile generator (121) generates the user specific profile (131) that best matches the user data (125).

Optionally, the user tracker (113) identifies the user (101) based on the user activity on the transaction terminal (105) (e.g., having visited a set of websites, currently visiting a type of web pages, search behavior, etc.).

The user data (125) may include an identifier of the user (101), such as a global unique identifier (GUID), a personal account number (PAN) (e.g., credit card number, debit card number, or other card account number), or other identifiers that uniquely and persistently identify the user (101) within a set of identifiers of the same type. Alternatively, the user data (125) may include other identifiers, such as an Internet Protocol (IP) address of the user (101), a name or user name of the user (101), or a browser cookie ID, which identify the user (101) in a local, temporary, transient and/or anonymous manner. Some of these identifiers of the user (101) may be provided by publishers, advertisers, ad networks, search engines, merchants, or the user tracker (113). Such identifiers can be correlated to the user (101) based on the overlapping or proximity of the time period of their usage to establish an identification reference table.

The identification reference table can be used to identify the account information (142) (e.g., account number) based on characteristics of the user (101) captured in the user data (125), such as browser cookie ID, IP addresses, and/or timestamps on the usage of the IP addresses. Optionally, the identification reference table is maintained by the operator of the transaction handler (103). Alternatively, the identification reference table is maintained by an entity other than the operator of the transaction handler (103).

In FIG. 5, the user tracker (113) determines certain characteristics of the user (101) to describe a type or group of users of which the user (101) is a member. The transaction profile of the group is used as the user specific profile (131). Examples of such characteristics include geographical location or neighborhood, types of online activities, specific online activities, or merchant propensity. The groups can be defined based on aggregate information (e.g., by time of day, or household), or segment (e.g., by cluster, propensity, demographics, cluster IDs, and/or factor values). The groups can be defined in part via one or more social networks. For example, a group may be defined based on social distances to one or more users on a social network website, interactions between users on a social network website, and/or common data in social network profiles of the users in the social network website.

The user data (125) may match different profiles at a different granularity or resolution (e.g., account, user, family, company, neighborhood, etc.), with different degrees of certainty. The profile selector (129) and/or the profile generator (121) may determine or select the user specific profile (131) with the finest granularity or resolution with acceptable certainty. Thus, the user specific profile (131) is most specific or closely related to the user (101).

Optionally, the advertisement selector (133) uses further data in prioritizing, selecting, generating, customizing and adjusting the user specific advertisement data (119). For example, the advertisement selector (133) may use search data in combination with the user specific profile (131) to provide benefits or offers to a user (101) at the point of interaction (107). For example, the user specific profile (131) can be used to personalize the advertisement, such as adjusting the placement of the advertisement relative to other advertisements, adjusting the appearance of the advertisement, etc.

Optionally, the user data (125) uses browser cookie information to identify the user (101). The browser cookie information is matched to account information (142) or the account number to identify the user specific profile (131), such as aggregated spending profile to present effective, timely, and relevant marketing information to the user (101), via the preferred communication channel (e.g., mobile communications, web, mail, email, POS, etc.) within a window of time that could influence the spending behavior of the user (101). Based on the transaction data (109), the user specific profile (131) can improve audience targeting for online advertising. Thus, customers will get better advertisements and offers presented to them; and the advertisers will achieve better return-on-investment for their advertisement campaigns.

The browser cookie that identifies the user (101) in online activities, such as web browsing, online searching, and using social networking applications, can be matched to an identifier of the user (101) in account data (111), such as the account number of a financial payment card of the user (101) or the account information (142) of the account identification device (141) of the user (101). The identifier of the user (101) can be uniquely identified via matching IP address, timestamp, cookie ID and/or other user data (125) observed by the user tracker (113).

Optionally, a look up table is used to map browser cookie information (e.g., IP address, timestamp, cookie ID) to the account data (111) that identifies the user (101) in the transaction handler (103). The look up table may be established via correlating overlapping or common portions of the user data (125) observed by different entities or different user trackers (113).

For example, a first user tracker (113) observes the card number of the user (101) at a particular IP address for a time period identified by a timestamp (e.g., via an online payment process); a second user tracker (113) observes the user (101) having a cookie ID at the same IP address for a time period near or overlapping with the time period observed by the first user tracker (113). Thus, the cookie ID as observed by the second user tracker (113) can be linked to the card number of the user (101) as observed by the first user tracker (113). The first user tracker (113) may be operated by the same entity operating the transaction handler (103) or by a different entity. Once the correlation between the cookie ID and the card number is established via a database or a look up table, the cookie ID can be subsequently used to identify the card number of the user (101) and the account data (111).

Optionally, the portal (143) is configured to observe a card number of a user (101) while the user (101) uses an IP address to make an online transaction. Thus, the portal (143) can identify a consumer account (146) based on correlating an IP address used to identify the user (101) and IP addresses recorded in association with the consumer account (146).

For example, when the user (101) makes a payment online by submitting the account information (142) to the transaction terminal (105) (e.g., an online store), the transaction handler (103) obtains the IP address from the transaction terminal (105) via the acquirer processor (147). The transaction handler (103) stores data to indicate the use of the account information (142) at the IP address at the time of the transaction request. When an IP address in the query received in the portal (143) matches the IP address previously recorded by the transaction handler (103), the portal (143) determines that the user (101) identified by the IP address in the request is the same user (101) associated with the account of the transaction initiated at the IP address. A match is found when the time of the query request is within a predetermined time period from the transaction request, such as a few minutes, one hour, a day, etc. The query may also include a cookie ID representing the user (101). Thus, through matching the IP address, the cookie ID is associated with the account information (142) in a persistent way.

Optionally, the portal (143) obtains the IP address of the online transaction directly. For example, a user (101) chooses to use a password in the account data (111) to protect the account information (142) for online transactions. When the account information (142) is entered into the transaction terminal (105) (e.g., an online store or an online shopping cart system), the user (101) is connected to the portal (143) for the verification of the password (e.g., via a pop up window, or via redirecting the web browser of the user (101)). The transaction handler (103) accepts the transaction request after the password is verified via the portal (143). Through this verification process, the portal (143) and/or the transaction handler (103) obtain the IP address of the user (101) at the time the account information (142) is used.

Optionally, the web browser of the user (101) communicates the user provided password to the portal (143) directly without going through the transaction terminal (105) (e.g., the server of the merchant). Alternatively, the transaction terminal (105) and/or the acquirer processor (147) may relay the password communication to the portal (143) or the transaction handler (103).

Optionally, the portal (143) is configured to identify the consumer account (146) based on the IP address identified in the user data (125) through mapping the IP address to a street address. For example, the user data (125) includes an IP address to identify the user (101); and the portal (143) can use a service to map the IP address to a street address. For example, an Internet service provider knows the street address of the currently assigned IP address. Once the street address is identified, the portal (143) can use the account data (111) to identify the consumer account (146) that has a current address at the identified street address. Once the consumer account (146) is identified, the portal (143) can provide a transaction profile (131) specific to the consumer account (146) of the user (101).

Optionally, the portal (143) uses a plurality of methods to identify consumer accounts (146) based on the user data (125). The portal (143) combines the results from the different methods to determine the most likely consumer account (146) for the user data (125).

Some details about the identification of consumer account (146) based on user data (125) can be found in U.S. Pat. No. 8,595,058, entitled "Systems and Methods to Match Identifiers", the disclosure of which is hereby incorporated herein by reference.

The correlator (117) can be used to "close the loop" for the tracking of consumer behavior across an on-line activity and an "off-line" activity that results at least in part from the on-line activity. Online activities, such as searching, web browsing, social networking, and/or consuming online advertisements, are correlated with respective transactions to generate the correlation result (123) in FIG. 5. The respective transactions may occur offline, in "brick and mortar" retail stores, or online but in a context outside the online activities, such as a credit card purchase that is performed in a way not visible to a search company that facilitates the search activities.

Optionally, the correlator (117) is configured to identify transactions resulting from searches or online advertisements. For example, in response to a query about the user (101) from the user tracker (113), the correlator (117) identifies an offline transaction performed by the user (101) and sends the correlation result (123) about the offline transaction to the user tracker (113), which allows the user tracker (113) to combine the information about the offline transaction and the online activities to provide significant marketing advantages.

For example, a marketing department could correlate an advertising budget to actual sales. For example, a marketer can use the correlation result (123) to study the effect of certain prioritization strategies, customization schemes, etc. on the impact on the actual sales. For example, the correlation result (123) can be used to adjust or prioritize advertisement placement on a web site, a search engine, a social networking site, an online marketplace, or the like.

Optionally, the profile generator (121) uses the correlation result (123) to augment the transaction profiles (127) with data indicating the rate of conversion from searches or advertisements to purchase transactions. For example, the correlation result (123) is used to generate predictive models to determine what a user (101) is likely to purchase when the user (101) is searching using certain keywords or when the user (101) is presented with an advertisement or offer. Optionally, the portal (143) is configured to report the correlation result (123) to a partner, such as a search engine, a publisher, or a merchant, to allow the partner to use the correlation result (123) to measure the effectiveness of advertisements and/or search result customization, to arrange rewards, etc.

Illustratively, a search engine entity may display a search page with particular advertisements for flat panel televisions produced by companies A, B, and C. The search engine entity may then compare the particular advertisements presented to a particular consumer with transaction data of that consumer and may determine that the consumer purchased a flat panel television produced by Company B. The search engine entity may then use this information and other information derived from the behavior of other consumers to determine the effectiveness of the advertisements provided by companies A, B, and C. The search engine entity can determine if the placement, the appearance, or other characteristic of the advertisement results in actual increased sales. Adjustments to advertisements (e.g., placement, appearance, etc.) may be made to facilitate maximum sales.

Optionally, the correlator (117) matches the online activities and the transactions based on matching the user data (125) provided by the user tracker (113) and the records of the transactions, such as transaction data (109) or transaction records. Alternatively, the correlator (117) matches the online activities and the transactions based on the redemption of offers/benefits provided in the user specific advertisement data (119).

Optionally, the portal (143) is configured to receive a set of conditions and an identification of the user (101), determine whether there is any transaction of the user (101) that satisfies the set of conditions, and if so, provide indications of the transactions that satisfy the conditions and/or certain details about the transactions, which allows the requester to correlate the transactions with certain user activities, such as searching, web browsing, consuming advertisements, etc.

The requester may not know the account number of the user (101); and the portal (143) is to map the identifier provided in the request to the account number of the user (101) to provide the requested information. Examples of the identifier being provided in the request to identify the user (101) include an identification of an iFrame of a web page visited by the user (101), a browser cookie ID, an IP address and the day and time corresponding to the use of the IP address, etc.

The information provided by the portal (143) can be used in pre-purchase marketing activities, such as customizing content or offers, prioritizing content or offers, selecting content or offers, etc., based on the spending pattern of the user (101). The content that is customized, prioritized, selected, or recommended may be the search results, blog entries, items for sale, etc.

The information provided by the portal (143) can be used in post-purchase activities. For example, the information can be used to correlate an offline purchase with online activities. For example, the information can be used to determine purchases made in response to media events, such as television programs, advertisements, news announcements, etc.

Some details about profile delivery, online activity to offline purchase tracking, techniques to identify the user specific profile (131) based on user data (125) (such as IP addresses), and targeted delivery of advertisement/offer/benefit are provided in U.S. Pat. No. 8,626,579, entitled "Systems and Methods for Closing the Loop between Online Activities and Offline Purchases", the disclosure of which application is incorporated herein by reference.

In FIG. 5, the correlator (117) is configured to receive information about the user specific advertisement data (119), monitor the transaction data (109), identify transactions that can be considered results of the advertisement corresponding to the user specific advertisement data (119), and generate the correlation result (123), as illustrated in FIG. 5.

When the advertisement and the corresponding transaction both occur in an online checkout process, a website used for the online checkout process can be used to correlate the transaction and the advertisement. However, the advertisement and the transaction may occur in separate processes and/or under control of different entities (e.g., when the purchase is made offline at a retail store, while the advertisement is presented outside the retail store). Optionally, the correlator (117) uses a set of correlation criteria to identify the transactions that can be considered as the results of the advertisements.

Optionally, the correlator (117) identifies the transactions linked or correlated to the user specific advertisement data (119) based on various criteria. For example, the user specific advertisement data (119) may include a coupon offering a benefit contingent upon a purchase made according to the user specific advertisement data (119). The use of the coupon identifies the user specific advertisement data (119), and thus allows the correlator (117) to correlate the transaction with the user specific advertisement data (119).

Optionally, the user specific advertisement data (119) is associated with the identity or characteristics of the user (101), such as global unique identifier (GUID), personal account number (PAN), alias, IP address, name or user name, geographical location or neighborhood, household, user group, and/or user data (125). The correlator (117) can link or match the transactions with the advertisements based on the identity or characteristics of the user (101) associated with the user specific advertisement data (119). For example, the portal (143) may receive a query identifying the user data (125) that tracks the user (101) and/or characteristics of the user specific advertisement data (119); and the correlator (117) identifies one or more transactions matching the user data (125) and/or the characteristics of the user specific advertisement data (119) to generate the correlation result (123).

Optionally, the correlator (117) identifies the characteristics of the transactions and uses the characteristics to search for advertisements that match the transactions. Such characteristics may include GUID, PAN, IP address, card number, browser cookie information, coupon, alias, etc.

In FIG. 5, the profile generator (121) uses the correlation result (123) to enhance the transaction profiles (127) generated from the profile generator (121). The correlation result (123) provides details on the purchases and/or indicates the effectiveness of the user specific advertisement data (119).

Optionally, the correlation result (123) is used to demonstrate to the advertisers the effectiveness of the advertisements, to process incentive or rewards associated with the advertisements, to obtain at least a portion of advertisement revenue based on the effectiveness of the advertisements, to improve the selection of advertisements, etc.

Optionally, the correlator (117) identifies a transaction that is a result of an advertisement (e.g., 119) when an offer or benefit provided in the advertisement is redeemed via the transaction handler (103) in connection with a purchase identified in the advertisement.

For example, when the offer is extended to the user (101), information about the offer can be stored in association with the account of the user (101) (e.g., as part of the account data (111)). The user (101) may visit the portal (143) of the transaction handler (103) to view the stored offer.

The offer stored in the account of the user (101) may be redeemed via the transaction handler (103) in various ways. For example, the correlator (117) may download the offer to the transaction terminal (105) via the transaction handler (103) when the characteristics of the transaction at the transaction terminal (105) match the characteristics of the offer.

After the offer is downloaded to the transaction terminal (105), the transaction terminal (105) automatically applies the offer when the condition of the offer is satisfied. Alternatively, the transaction terminal (105) allows the user (101) to selectively apply the offers downloaded by the correlator (117) or the transaction handler (103). Optionally, the correlator (117) sends reminders to the user (101) at a separate point of interaction (107) (e.g., a mobile phone) to remind the user (101) to redeem the offer. Optionally, the transaction handler (103) applies the offer (e.g., via statement credit), without having to download the offer (e.g., coupon) to the transaction terminal (105). Some examples and details of redeeming offers via statement credit can be found in U.S. Pat. App. Pub. No. 2010/0114686, entitled "Real-Time Statement Credits and Notifications," the disclosure of which is hereby incorporated herein by reference.

Optionally, the offer is captured as an image and stored in association with the account of the user (101). Alternatively, the offer is captured in a text format (e.g., a code and a set of criteria), without replicating the original image of the coupon.

Optionally, when the coupon is redeemed, the advertisement presenting the coupon is correlated with a transaction in which the coupon is redeemed, and/or is determined to have resulted in a transaction. Optionally, the correlator (117) identifies advertisements that have resulted in purchases, without having to identify the specific transactions that correspond to the advertisements.

Some details about offer redemption via the transaction handler (103) are provided in U.S. Pat. App. Pub. No. 2011/0125565, entitled "Systems and Methods for Multi-Channel Offer Redemption", the disclosure of which is hereby incorporated herein by reference.

The transaction terminal (105) may be an automatic teller machine (ATM), which is also the point of interaction (107). When the user (101) approaches the ATM to make a transaction (e.g., to withdraw cash via a credit card or debit card), the ATM transmits account information (142) to the transaction handler (103). The account information (142) can also be considered as the user data (125) to select the user specific profile (131). The user specific profile (131) can be sent to an advertisement network to query for a targeted advertisement. After the advertisement network matches the user specific profile (131) with user specific advertisement data (119) (e.g., a targeted advertisement), the transaction handler (103) may send the advertisement to the ATM, together with the authorization for cash withdrawal.

The advertisement shown on the ATM may include a coupon that offers a benefit that is contingent upon the user (101) making a purchase according to the advertisement. The user (101) may view the offer presented on a white space on the ATM screen and select to load or store the coupon in a storage device of the transaction handler (103) under the account of the user (101). The transaction handler (103) communicates with the bank to process the cash withdrawal. After the cash withdrawal, the ATM prints the receipt which includes a confirmation of the coupon, or a copy of the coupon. The user (101) may then use the coupon printed on the receipt. Alternatively, when the user (101) uses the same account to make a relevant purchase, the transaction handler (103) may automatically apply the coupon stored under the account of the user (101), or automatically download the coupon to the relevant transaction terminal (105), or transmit the coupon to the mobile phone of the user (101) to allow the user (101) to use the coupon via a display of the coupon on the mobile phone. The user (101) may visit a web portal (143) of the transaction handler (103) to view the status of the coupons collected in the account of the user (101).

Optionally, the advertisement is forwarded to the ATM via the data stream for authorization. Alternatively, the ATM makes a separate request to a server of the transaction handler (103) (e.g., a web portal) to obtain the advertisement. Alternatively, or in combination, the advertisement (including the coupon) is provided to the user (101) at separate, different points of interactions, such as via a text message to a mobile phone of the user (101), via an email, via a bank statement, etc.

Some details of presenting targeted advertisements on ATMs based on purchasing preferences and location data are provided in U.S. Pat. App. Pub. No. 2010/0114677, entitled "System Including Automated Teller Machine with Data Bearing Medium," the disclosure of which is hereby incorporated herein by reference.

In another example, the transaction terminal (105) is a POS terminal at the checkout station in a retail store (e.g., a self-service checkout register). When the user (101) pays for a purchase via a payment card (e.g., a credit card or a debit card), the transaction handler (103) provides a targeted advertisement having a coupon obtained from an advertisement network. The user (101) may load the coupon into the account of the payment card and/or obtain a hardcopy of the coupon from the receipt. When the coupon is used in a transaction, the advertisement is linked to the transaction.

Some details of presenting targeted advertisements during the process of authorizing a financial payment card transaction can be found in U.S. Pat. App. Pub. No. 2008/0275771, entitled "Merchant Transaction Based Advertising," the disclosure of which is hereby incorporated herein by reference.

Optionally, the user specific advertisement data (119), such as offers or coupons, is provided to the user (101) via the transaction terminal (105) in connection with an authorization message during the authorization of a transaction processed by the transaction handler (103). The authorization message can be used to communicate the rewards qualified for by the user (101) in response to the current transaction, the status and/or balance of rewards in a loyalty program, etc. Some examples and details related to the authorization process are provided in U.S. Pat. App. Pub. No. 2007/0100691, entitled "Method and System for Conducting Promotional Programs," the disclosure of which is hereby incorporated herein by reference.

When the user (101) is conducting a transaction with a first merchant via the transaction handler (103), the transaction handler (103) may determine whether the characteristics of the transaction satisfy the conditions specified for an announcement, such as an advertisement, offer or coupon, from a second merchant. If the conditions are satisfied, the transaction handler (103) provides the announcement to the user (101). Optionally, the transaction handler (103) may auction the opportunity to provide the announcements to a set of merchants. Some examples and details related to the delivery of such announcements can be found in U.S. Pat. App. Pub. No. 2010/0274625, entitled "Targeting Merchant Announcements Triggered by Consumer Activity Relative to a Surrogate Merchant," the disclosure of which is hereby incorporated herein by reference.

Optionally, the user (101) may visit a third party website, which is the point of interaction (107) in FIG. 5. The third party website may be a web search engine, a news website, a blog, a social network site, etc. The behavior of the user (101) at the third party website may be tracked via a browser cookie, which uses a storage space of the browser to store information about the user (101) at the third party website. Alternatively, or in combination, the third party website uses the server logs to track the activities of the user (101). The third party website may allow an advertisement network to present advertisements on portions of the web pages. The advertisement network tracks the user behavior using its server logs and/or browser cookies. For example, the advertisement network may use a browser cookie to identify a particular user across multiple websites. Based on the referral uniform resource locators (URL) that cause the advertisement network to load advertisements in various web pages, the advertisement network can determine the online behavior of the user (101) via analyzing the web pages that the user (101) has visited. Based on the tracked online activities of the user (101), the user data (125) that characterizes the user (101) can be formed to query the profile selector (129) for a user specific profile (131).

The cookie identity of the user (101) as tracked using the cookie can be correlated to an account of the user (101), the family of the user (101), the company of the user (101), or other groups that include the user (101) as a member. Thus, the cookie identity can be used as the user data (125) to obtain the user specific profile (131). For example, when the user (101) makes an online purchase from a web page that contains an advertisement that is tracked with the cookie identity, the cookie identity can be correlated to the online transaction and thus to the account of the user (101). For example, when the user (101) visits a web page after authentication of the user (101), and the web page includes an advertisement from the advertisement network, the cookie identity can be correlated to the authenticated identity of the user (101). For example, when the user (101) signs in to a web portal of the transaction handler (103) to access the account of the user (101), the cookie identity used by the advertisement network on the web portal can be correlated to the account of the user (101).

Other online tracking techniques can also be used to correlate the cookie identity of the user (101) with an identifier of the user (101) known by the profile selector (129), such as a GUID, PAN, account number, customer number, social security number, etc. Subsequently, the cookie identity can be used to select the user specific profile (131).

The entity operating the transaction handler (103) may provide intelligence for providing multiple communications regarding an advertisement. The multiple communications may be directed to two or more points of interaction with the user (101).

For example, after the user (101) is provided with an advertisement via the transaction terminal (105), reminders or revisions to the advertisements can be sent to the user (101) via a separate point of interaction (107), such as a mobile phone, email, text message, etc. For example, the advertisement may include a coupon to offer the user (101) a benefit contingent upon a purchase. If the correlator (117)

determines that the coupon has not been redeemed, the correlator (117) may send a message to the mobile phone of the user (101) to remind the user (101) about the offer, and/or revise the offer.

Some examples of multiple communications related to an offer can be found in U.S. Pat. App. Pub. No. 2011/0022424, entitled "Successive Offer Communications with an Offer Recipient," the disclosure of which is hereby incorporated herein by reference.

Optionally, the transaction handler (103) uses the account data (111) to store information for third party loyalty programs. The transaction handler (103) processes payment transactions made via financial transaction cards, such as credit cards, debit cards, banking cards, etc.; and the financial transaction cards can be used as loyalty cards for the respective third party loyalty programs. Since the third party loyalty programs are hosted on the transaction handler (103), the consumers do not have to carry multiple, separate loyalty cards (e.g., one for each merchant that offers a loyalty program); and the merchants do not have to spend a large setup and investment fee to establish the loyalty program. The loyalty programs hosted on the transaction handler (103) can provide flexible awards for consumers, retailers, manufacturers, issuers, and other types of business entities involved in the loyalty programs. The integration of the loyalty programs into the accounts of the customers on the transaction handler (103) allows new offerings, such as merchant cross-offerings or bundling of loyalty offerings. Some examples of such loyalty programs are provided in U.S. Pat. Pub. No. 2011/0087530, entitled "Systems and Methods to Provide Loyalty Programs", the entire disclosure of which is hereby incorporated herein by reference.

Optionally, merchants generate stock-keeping unit (SKU) or other specific information that identifies the particular goods and services purchased by the user (101) or customer. The SKU information may be provided to the operator of the transaction handler (103) that processed the purchases. The operator of the transaction handler (103) may store the SKU information as part of transaction data (109), and reflect the SKU information for a particular transaction in a transaction profile (127 or 131) associated with the person involved in the transaction.

When a user (101) shops at a traditional retail store or browses a website of an online merchant, an SKU-level profile associated specifically with the user (101) may be provided to select an advertisement appropriately targeted to the user (101) (e.g., via mobile phones, POS terminals, web browsers, etc.). The SKU-level profile for the user (101) may include an identification of the goods and services historically purchased by the user (101). In addition, the SKU-level profile for the user (101) may identify goods and services that the user (101) may purchase in the future. The identification may be based on historical purchases reflected in SKU-level profiles of other individuals or groups that are determined to be similar to the user (101). Accordingly, the return on investment for advertisers and merchants can be greatly improved.

Preferably, the user specific profile (131) is an aggregated spending profile that is generated using the SKU-level information. For example, the factor values correspond to factor definitions that are generated based on aggregating spending in different categories of products and/or services. A typical merchant offers products and/or services in many different categories.

For example, the user (101) may enter into transactions with various online and "brick and mortar" merchants. The transactions may involve the purchase of various items of goods and services. The goods and services may be identified by SKU numbers or other information that specifically identifies the goods and services purchased by the user (101).

The merchant may provide the SKU information regarding the goods and services purchased by the user (101) (e.g., purchase details at SKU level) to the operator of the transaction handler (103). The SKU information may be provided to the operator of the transaction handler (103) in connection with a loyalty program, as described in more detail below. The SKU information may be stored as part of the transaction data (109) and associated with the user (101). The SKU information for items purchased in transactions facilitated by the operator of the transaction handler (103) may be stored as transaction data (109) and associated with its associated purchaser.

Optionally, the SKU level purchase details are requested from the merchants or retailers via authorization responses (e.g., as illustrated in U.S. Pat. App. Pub. No. 2011/0093335, entitled "Systems and Methods for Advertising Services Based on an SKU-Level Profile", and U.S. Pat. App. Pub. No. 2011-0288918, entitled "Systems and Methods for Redemption of Offers", the entire disclosures of which applications are hereby incorporated herein by reference), when the account (146) of the user (101) is enrolled in a program that allows the transaction handler (103) (and/or the issuer processor (145)) to collect the purchase details.

Based on the SKU information and perhaps other transaction data, the profile generator (121) may create an SKU-level transaction profile for the user (101). For example, based on the SKU information associated with the transactions for each person entering into transactions with the operator of the transaction handler (103), the profile generator (121) may create an SKU-level transaction profile for each person.

The SKU information associated with a group of purchasers may be aggregated to create an SKU-level transaction profile that is descriptive of the group. The group may be defined based on one or a variety of considerations. For example, the group may be defined by common demographic features of its members. As another example, the group may be defined by common purchasing patterns of its members.

The user (101) may later consider the purchase of additional goods and services. The user (101) may shop at a traditional retailer or an online retailer. With respect to an online retailer, for example, the user (101) may browse the website of an online retailer, publisher, or merchant. The user (101) may be associated with a browser cookie to, for example, identify the user (101) and track the browsing behavior of the user (101).

The retailer may provide the browser cookie associated with the user (101) to the operator of the transaction handler (103). Based on the browser cookie, the operator of the transaction handler (103) may associate the browser cookie with a personal account number of the user (101). The association may be performed by the operator of the transaction handler (103) or another entity in a variety of manners such as, for example, using a look up table.

Based on the personal account number, the profile selector (129) may select a user specific profile (131) that constitutes the SKU-level profile associated specifically with the user (101). The SKU-level profile may reflect the individual, prior purchases of the user (101) specifically, and/or the types of goods and services that the user (101) has purchased.

The SKU-level profile for the user (101) may also include identifications of goods and services the user (101) may purchase in the future. For example, the identifications may be used for the selection of advertisements for goods and services that may be of interest to the user (101). The identifications for the user (101) may be based on the SKU-level information associated with historical purchases of the user (101). The identifications for the user (101) may be additionally or alternatively based on transaction profiles associated with others. The recommendations may be determined by predictive association and other analytical techniques.

For example, the identifications for the user (101) may be based on the transaction profile of another person. The profile selector (129) may apply predetermined criteria to identify another person who, to a predetermined degree, is deemed sufficiently similar to the user (101). The identification of the other person may be based on a variety of factors including, for example, demographic similarity and/or purchasing pattern similarity between the user (101) and the other person. As one example, the common purchase of identical items or related items by the user (101) and the other person may result in an association between the user (101) and the other person, and a resulting determination that the user (101) and the other person are similar. Once the other person is identified, the transaction profile constituting the SKU-level profile for the other person may be analyzed. Through predictive association and other modeling and analytical techniques, the historical purchases reflected in the SKU-level profile for the other person may be employed to predict the future purchases of the user (101).

As another example, the identifications of the user (101) may be based on the transaction profiles of a group of persons. The profile selector (129) may apply predetermined criteria to identify a multitude of persons who, to a predetermined degree, are deemed sufficiently similar to the user (101). The identification of the other persons may be based on a variety of factors including, for example, demographic similarity and/or purchasing pattern similarity between the user (101) and the other persons. Once the group constituting the other persons is identified, the transaction profile constituting the SKU-level profile for the group may be analyzed. Through predictive association and other modeling and analytical techniques, the historical purchases reflected in the SKU-level profile for the group may be employed to predict the future purchases of the user (101).

The SKU-level profile of the user (101) may be provided to select an advertisement that is appropriately targeted. Because the SKU-level profile of the user (101) may include identifications of the goods and services that the user (101) may be likely to buy, advertisements corresponding to the identified goods and services may be presented to the user (101). In this way, targeted advertising for the user (101) may be optimized. Further, advertisers and publishers of advertisements may improve their return on investment, and may improve their ability to cross-sell goods and services.

SKU-level profiles of others who are identified to be similar to the user (101) may be used to identify a user (101) who may exhibit a high propensity to purchase goods and services. For example, if the SKU-level profiles of others reflect a quantity or frequency of purchase that is determined to satisfy a threshold, then the user (101) may also be classified or predicted to exhibit a high propensity to purchase. Accordingly, the type and frequency of advertisements that account for such propensity may be appropriately tailored for the user (101).

The SKU-level profile of the user (101) may reflect transactions with a particular merchant or merchants. The SKU-level profile of the user (101) may be provided to a business that is considered a peer with or similar to the particular merchant or merchants. For example, a merchant may be considered a peer of the business because the merchant offers goods and services that are similar to or related to those of the business. The SKU-level profile reflecting transactions with peer merchants may be used by the business to better predict the purchasing behavior of the user (101) and to optimize the presentation of targeted advertisements to the user (101).

Some details on SKU-level profile can be found in U.S. Pat. App. Pub. No. 2011/0093335, entitled "Systems and Methods for Advertising Services Based on an SKU-Level Profile", the disclosure of which is hereby incorporated herein by reference.

Optionally, the transaction handler (103) is configured to selectively request purchase details via authorization responses. When the transaction handler (103) (and/or the issuer processor (145)) needs purchase details, such as identification of specific items purchased and/or their prices, the authorization responses transmitted from the transaction handler (103) is to include an indicator to request for the purchase details for the transaction that is being authorized. The merchants are to determine whether or not to submit purchase details based on whether or not there is a demand indicated in the authorization responses from the transaction handler (103).

For example, the transaction handler (103) is configured for the redemption of manufacturer coupons via statement credits. Manufacturers may provide users (e.g., 101) with promotional offers, such as coupons for rebate, discounts, cash back, reward points, gifts, etc. The offers can be provided to users (e.g., 101) via various channels, such as websites, newspapers, direct mail, targeted advertisements (e.g., 119), loyalty programs, etc.

When the user (101) has one or more offers pending under the consumer account (146) and uses the consumer account (146) to pay for purchases made from a retailer that supports the redemption of the offers, the transaction handler (103) is to use authorization responses to request purchase details, match offer details against the items shown to be purchased in the purchase details to identify a redeemable offer, and manage the funding for the fulfillment of the redeemable offer between the user (101) and the manufacturer that funded the corresponding offer. Optionally, the request for purchase details is provided in real time with the authorization message; and the exchange of the purchase details and matching may occur real-time outside the authorization process, or at the end of the day via a batch file for multiple transactions.

Optionally, the offers are associated with the consumer account (146) of the user (101) to automate the processing of the redemption of the offers. If the user (101) makes a payment for a purchase using the consumer account (146) of the user (101), the transaction handler (103) (and/or the issuer processor (145)) processes the payment transaction and automatically identifies the offers that are qualified for redemption in view of the purchase and provides the benefit of the qualified offers to the user (101). Optionally, the transaction handler (103) (or the issuer processor (145)) is to detect the applicable offer for redemption and provide the benefit of the redeemed offer via statement credits, without having to request the user (101) to perform additional tasks.

Once the user (101) makes the required purchase according to the requirement of the offer using the consumer account (146), the benefit of the offer is fulfilled via the transaction handler (103) (or the issuer processor (145)) without the user (101) having to do anything special at and/or after the time of checkout, other than paying with the consumer account (146) of the user (101), such as a credit card account, a debit card account, a loyalty card account, a private label card account, a coupon card account, or a prepaid card account that is enrolled in the program for the automation of offer redemption.

Optionally, the redemption of an offer (e.g., a manufacturer coupon) requires the purchase of a specific product or service. The user (101) is eligible for the benefit of the offer after the purchase of the specific product or service is verified. The transaction handler (103) (or the issuer processor (145)) may dynamically request the purchase details via authorization response to determine the eligibility of a purchase for the redemption of such an offer.

The methods to request purchase details on demand via (or in connection with) the authorization process are used in other situations where the transaction level data is needed on a case-by-case basis as determined by the transaction handler (103).

For example, when the transaction handler (103) and/or the issuer processor (145) determines that the user (101) has signed up to receive purchase item detail electronically, the transaction handler (103) and/or the issuer processor (145) can make the request on demand; and the purchase details can be stored and later downloaded into a personal finance software application or a business accounting software application.

For example, the transaction handler (103) and/or the issuer processor (145) determines that the user (101) has signed up to automate the process of reimbursements of health care items qualified under certain health care accounts, such as a health savings account (HSA), a flexible spending arrangement (FSA), etc. In response to such a determination, the transaction handler (103) and/or the issuer processor (145) requests the purchase details to automatically identify qualified health care item purchases, capture and reporting evidences showing the qualification, bookkeeping the receipts or equivalent information for satisfy rules, regulations and laws reporting purposes (e.g., as required by Internal Revenue Service), and/or settle the reimbursement of the funds with the respective health care accounts.

Some details and examples offer fulfillment can be found in U.S. Pat. App. Pub. No. 2011/0288918, entitled "Systems and Methods for Redemption of Offers," the disclosure of which is hereby incorporated herein by reference.

Optionally, the user specific advertisement data (119) is provided to the transaction terminal (105), via the transaction handler (103) and/or the portal (143), in connection with an authorization request from the transaction terminal (105), such as in examples provided in U.S. Pat. No. 8,606,630, entitled "Systems and Methods to Deliver Targeted Advertisements to Audience", the disclosure of which is hereby incorporated herein by reference.

Variations

A system may use more or fewer components than those illustrated in FIGS. 1, 3, and 5-9. For example, the user specific profile (131) may be used by a search engine to prioritize search results. The correlator (117) may be configured to correlate transactions with online activities, such as searching, web browsing, and social networking, instead of or in addition to the user specific advertisement data (119). Optionally, the correlator (117) is configured to correlate transactions and/or spending patterns with news announcements, market changes, events, natural disasters, etc. Optionally, the data to be correlated by the correlator with the transaction data (109) may not be personalized via the user specific profile (131) and may not be user specific. Optionally, multiple different devices are used at the point of interaction (107) for interaction with the user (101); and some of the devices may not be capable of receiving input from the user (101). Optionally, there are transaction terminals (105) to initiate transactions for a plurality of users (101) with a plurality of different merchants. Optionally, the account information (142) is provided to the transaction terminal (105) directly (e.g., via phone or Internet) without the use of the account identification device (141).

Optionally, at least some of the profile generator (121), correlator (117), profile selector (129), and advertisement selector (133) are controlled by the entity that operates the transaction handler (103). Alternatively, at least some of the profile generator (121), correlator (117), profile selector (129), and advertisement selector (133) are not controlled by the entity that operates the transaction handler (103).

For example, the entity operating the transaction handler (103) provides the intelligence (e.g., transaction profiles (127) or the user specific profile (131)) for the selection of the advertisement; and a third party (e.g., a web search engine, a publisher, or a retailer) may present the advertisement in a context outside a transaction involving the transaction handler (103) before the advertisement results in a purchase.

For example, the customer may interact with the third party at the point of interaction (107); and the entity controlling the transaction handler (103) may allow the third party to query for intelligence information (e.g., transaction profiles (127), or the user specific profile (131)) about the customer using the user data (125), thus informing the third party of the intelligence information for targeting the advertisements, which can be more useful, effective and compelling to the user (101). For example, the entity operating the transaction handler (103) may provide the intelligence information without generating, identifying or selecting advertisements; and the third party receiving the intelligence information may identify, select and/or present advertisements.

Through the use of the transaction data (109), account data (111), correlation results (123), the context at the point of interaction, and/or other data, relevant and compelling messages or advertisements can be selected for the customer at the points of interaction (e.g., 107) for targeted advertising. The messages or advertisements are thus delivered at the optimal time for influencing or reinforcing brand perceptions and revenue-generating behavior. The customers receive the advertisements in the media channels that they like and/or use most frequently.

Typically, the transaction data (109) includes transaction amounts, the identities of the payees (e.g., merchants), and the date and time of the transactions. The identities of the payees can be correlated to the businesses, services, products and/or locations of the payees. For example, the transaction handler (103) maintains a database of merchant data, including the merchant locations, businesses, services, products, etc. Thus, the transaction data (109) can be used to determine the purchase behavior, pattern, preference, tendency, frequency, trend, budget and/or propensity of the customers in relation to various types of businesses, services and/or products and in relation to time.

Optionally, the products and/or services purchased by the user (101) are also identified by the information transmitted from the merchants or service providers. Thus, the transaction data (109) may include identification of the individual products and/or services, which allows the profile generator (121) to generate transaction profiles (127) with fine granularity or resolution. The granularity or resolution may be at a level of distinct products and services that can be purchased (e.g., stock-keeping unit (SKU) level), or category or type of products or services, or vendor of products or services, etc.

The profile generator (121) may consolidate transaction data for a person having multiple accounts to derive intelligence information about the person to generate a profile for the person (e.g., transaction profiles (127), or the user specific profile (131)).

The profile generator (121) may consolidate transaction data fora family having multiple accounts held by family members to derive intelligence information about the family to generate a profile for the family (e.g., transaction profiles (127), or the user specific profile (131)).

Similarly, the profile generator (121) may consolidate transaction data for a group of persons, after the group is identified by certain characteristics, such as gender, income level, geographical location or region, preference, characteristics of past purchases (e.g., merchant categories, purchase types), cluster, propensity, demographics, social networking characteristics (e.g., relationships, preferences, activities on social networking websites), etc. The consolidated transaction data can be used to derive intelligence information about the group to generate a profile for the group (e.g., transaction profiles (127), or the user specific profile (131)).

Optionally, the profile generator (121) may consolidate transaction data according to the user data (125) to generate a profile specific to the user data (125).

Since the transaction data (109) are records and history of past purchases, the profile generator (121) can derive intelligence information about a customer using an account, a customer using multiple accounts, a family, a company, or other groups of customers, about what the targeted audience is likely to purchase in the future, how frequently, and their likely budgets for such future purchases. Intelligence information is useful in selecting the advertisements that are most useful, effective and compelling to the customer, thus increasing the efficiency and effectiveness of the advertising process.

Optionally, the transaction data (109) are enhanced with correlation results (123) correlating past advertisements and purchases that result at least in part from the advertisements. Thus, the intelligence information can be more accurate in assisting with the selection of the advertisements. The intelligence information may not only indicate what the audience is likely to purchase, but also how likely the audience is to be influenced by advertisements for certain purchases, and the relative effectiveness of different forms of advertisements for the audience. Thus, the advertisement selector (133) can select the advertisements to best use the opportunity to communicate with the audience. Further, the transaction data (109) can be enhanced via other data elements, such as program enrollment, affinity programs, redemption of reward points (or other types of offers), online activities, such as web searches and web browsing, social networking information, etc., based on the account data (111) and/or other data, such as non-transactional data discussed in U.S. Pat. App. Pub. No. 2011/0054981, entitled "Analyzing Local Non-Transactional Data with Transactional Data in Predictive Models," the disclosure of which is hereby incorporated herein by reference.

Optionally, the entity operating the transaction handler (103) provides the intelligence information in real time as the request for the intelligence information occurs. Alternatively, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

Optionally, the intelligence information is communicated to various entities in the system in a way similar to, and/or in parallel with the information flow in the transaction system to move money. The transaction handler (103) routes the information in the same way it routes the currency involved in the transactions.

Optionally, the portal (143) provides a user interface to allow the user (101) to select items offered on different merchant websites and store the selected items in a wish list for comparison, reviewing, purchasing, tracking, etc. The information collected via the wish list can be used to improve the transaction profiles (127) and derive intelligence on the needs of the user (101); and targeted advertisements can be delivered to the user (101) via the wish list user interface provided by the portal (143). Some examples of user interface systems to manage wish lists can be found in U.S. Pat. App. Pub. No. 2010/0174623, entitled "System and Method for Managing Items of Interest Selected from Online Merchants," the disclosure of which is hereby incorporated herein by reference.

In FIG. 5, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. Optionally, a transaction may be initiated by a server (e.g., based on a stored schedule for recurrent payments).

Over a period of time, the transaction handler (103) accumulates the transaction data (109) from transactions initiated at different transaction terminals (e.g., 105) for different users (e.g., 101). The transaction data (109) thus includes information on purchases made by various users (e.g., 101) at various times via different purchases options (e.g., online purchase, offline purchase from a retail store, mail order, order via phone, etc.)

The accumulated transaction data (109) and the corresponding account data (111) can be used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

FIG. 6 shows a system to provide information based on transaction data (109). In FIG. 6, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149).

The portal (143) is coupled to the data warehouse (149) to provide information based on the transaction records, such as the transaction profiles (127) or aggregated spending profile. The portal (143) may be implemented as a web portal, a telephone gateway, a file/data server, etc.

Optionally, the portal (143) is configured to receive queries identifying search criteria from the profile selector (129), the advertisement selector (133) and/or third parties and in response, to provide transaction-based intelligence requested by the queries.

For example, a query is to specify a plurality of account holders to request the portal (143) to deliver the transaction profiles (127) of account holders in a batch mode.

For example, a query is to identify the user (101) to request the user specific profile (131), or the aggregated spending profile, of the user (101). The user (101) may be identified using the account data (111), such as the account number, or the user data (125) such as browser cookie ID, IP address, etc.

For example, a query is to identify a retail location; and the portal (143) is to provide a profile (e.g., 341) that summarizes the aggregated spending patterns of users who have shopped at the retail location within a period of time.

For example, a query is to identify a geographical location; and the portal (143) is to provide a profile (e.g., 341) that summarizes the aggregated spending patterns of users who have been to, or who are expected to visit, the geographical location within a period of time (e.g., as determined or predicted based on the locations of the point of interactions (e.g., 107) of the users).

For example, a query is to identify a geographical area; and the portal (143) is to provide a profile (e.g., 341) that summarizes the aggregated spending patterns of users who reside in the geographical area (e.g., as determined by the account data (111), or who have made transactions within the geographical area with a period of time (e.g., as determined by the locations of the transaction terminals (e.g., 105) used to process the transactions).

Optionally, the portal (143) is configured to register certain users (101) for various programs, such as a loyalty program to provide rewards and/or offers to the users (101).

Optionally, the portal (143) is to register the interest of users (101), or to obtain permissions from the users (101) to gather further information about the users (101), such as data capturing purchase details, online activities, etc.

Optionally, the user (101) may register via the issuer; and the registration data in the consumer account (146) may propagate to the data warehouse (149) upon approval from the user (101).

Optionally, the portal (143) is to register merchants and provide services and/or information to merchants.

Optionally, the portal (143) is to receive information from third parties, such as search engines, merchants, web sites, etc. The third party data can be correlated with the transaction data (109) to identify the relationships between purchases and other events, such as searches, news announcements, conferences, meetings, etc., and improve the prediction capability and accuracy.

In FIG. 6, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141). The issuer processor (145) is to charge the consumer account (146) to pay for purchases.

The account identification device (141) may be a plastic card having a magnetic strip storing account information (142) identifying the consumer account (146) and/or the issuer processor (145). Alternatively, the account identification device (141) is a smartcard having an integrated circuit chip storing at least the account information (142). Optionally, the account identification device (141) includes a mobile phone having an integrated smartcard.

The account information (142) may be printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

Typically, the transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

The transaction handler (103), the issuer processor (145), and the acquirer processor (147) may each include a subsystem to identify the risk in the transaction and may reject the transaction based on the risk assessment.

Optionally, the account identification device (141) includes security features to prevent unauthorized uses of the consumer account (146), such as a logo to show the authenticity of the account identification device (141), encryption to protect the account information (142), etc.

The transaction terminal (105) is typically configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

The transaction terminal (105) may be a POS terminal at a traditional, offline, "brick and mortar" retail store. Alternatively, the transaction terminal (105) is an online server that receives account information (142) of the consumer account (146) from the user (101) through a web connection.

Optionally, the user (101) may provide account information (142) through a telephone call, via verbal communications with a representative of the merchant; and the representative enters the account information (142) into the transaction terminal (105) to initiate the transaction.

Typically, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

Optionally, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

Typically, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. Optionally, dedicated communication channels are used between the transaction handler (103) and the issuer processor (145), between the transaction handler (103) and the acquirer processor (147), and/or between the portal (143) and the transaction handler (103).

The transaction handler (103) uses the data warehouse (149) to store the records about the transactions, such as the transaction records or transaction data (109). Optionally, the transaction handler (103) includes a powerful computer, or cluster of computers functioning as a unit, controlled by instructions stored on a computer readable medium.

The transaction handler (103) is typically configured to support and deliver authorization services, exception file services, and clearing and settlement services. Typically, the transaction handler (103) has a subsystem to process authorization requests and another subsystem to perform clearing and settlement services.

The transaction handler (103) is typically configured to process different types of transactions, such credit card transactions, debit card transactions, prepaid card transactions, and other types of commercial transactions.

The transaction handler (103) facilitates the communications between the issuer processor (145) and the acquirer processor (147).

Optionally, the transaction handler (103) is coupled to the portal (143) (and/or the profile selector (129), the advertisement selector (133), the media controller (115)) to charge the fees for the services of providing the transaction-based intelligence information and/or advertisement.

For example, the system illustrated in FIG. 5 is configured to deliver advertisements to the point of interaction (107) of the user (101), based on the transaction-based intelligence information; and the transaction handler (103) is configured to charge the advertisement fees to the account of the advertiser in communication with the issuer processor in control of the account of the advertiser. The advertisement fees may be charged in response to the presentation of the advertisement, or in response to the completion of a pre-determined number of presentations, or in response to a transaction resulted from the presentation of the advertisement. Optionally, the transaction handler (103) is configured to charge a periodic fee (e.g., monthly fee, annual fee) to the account of the advertiser in communication with the respective issuer processor that is similar to the issuer processor (145) of the consumer account (146).

For example, the portal (143) is configured to provide transaction-based intelligence information in response to the queries received in the portal (143). The portal (143) is to identify the requesters (e.g., via an authentication, or the address of the requesters) and instruct the transaction handler (103) to charge the consumer accounts (e.g., 146) of the respective requesters for the transaction-based intelligence information. Optionally, the accounts of the requesters are charged in response to the delivery of the intelligence information via the portal (143). Optionally, the accounts of the requesters are charged a periodic subscription fee for the access to the query capability of the portal (143).

The information service provided by the system illustrated in FIG. 5 may include multiple parties, such as one entity operating the transaction handler (103), one entity operating the advertisement data (135), one entity operating the user tracker (113), one entity operating the media controller (115), etc. The transaction handler (103) is used to generate transactions to settle the fees, charges and/or divide revenues using the accounts of the respective parties. The account information of the parties can be stored in the data warehouse (149) coupled to the transaction handler (103). Optionally, a separate billing engine is used to generate the transactions to settle the fees, charges and/or divide revenues.

The transaction terminal (105) is typically configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

The issuer processor (145) typically provides funds to make payments on behalf of the consumer account (146). The acquirer processor (147) typically receives the funds on behalf of the merchant account (148). The issuer processor (145) and the acquirer processor (147) communicate with the transaction handler (103) to coordinate the transfer of funds for the transaction. Preferably, the funds are transferred electronically.

The transaction terminal (105) may submit a transaction directly for settlement, without having to separately submit an authorization request.

Optionally, the portal (143) provides a user interface to allow the user (101) to organize the transactions in one or more consumer accounts (146) of the user with one or more issuers. The user (101) may organize the transactions using information and/or categories identified in the transaction records, such as merchant category, transaction date, amount, etc. Some examples and techniques can be found in U.S. Pat. App. Pub. No. 2007/0055597, entitled "Method and System for Manipulating Purchase Information," the disclosure of which is hereby incorporated herein by reference.

Optionally, the portal (143) provides transaction based statistics, such as indicators for retail spending monitoring, indicators for merchant benchmarking, industry/market segmentation, indicators of spending patterns, etc. Some examples can be found in U.S. Pat. App. Pub. No. 2009/

0048884, entitled "Merchant Benchmarking Tool," the disclosure of which application is hereby incorporated herein by reference.

Transaction Terminal

FIG. 7 illustrates a transaction terminal. In FIG. 7, the transaction terminal (105) is configured to interact with an account identification device (141) to obtain account information (142) about the consumer account (146).

In FIG. 7, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

Typically, the reader (163) includes a magnetic strip reader. Optionally, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

The input device (153) may include key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

Optionally, the output device (165) may include a display, a speaker, and/or a printer to present information, such as the result of an authorization request, a receipt for the transaction, an advertisement, etc.

In FIG. 7, the network interface (161) is configured to communicate with the acquirer processor (147) via a telephone connection, an Internet connection, or a dedicated data communication channel.

In FIG. 7, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

A transaction terminal (105) may have fewer components than those illustrated in FIG. 7. For example, the transaction terminal (105) is configured for "card-not-present" transactions; and the transaction terminal (105) does not have a reader (163).

A transaction terminal (105) may have more components than those illustrated in FIG. 7. For example, the transaction terminal (105) is an ATM machine, which includes components to dispense cash under certain conditions.

Account Identification Device

FIG. 8 illustrates an account identifying device. In FIG. 8, the account identification device (141) is configured to carry account information (142) that identifies the consumer account (146).

In FIG. 8, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

The account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

The account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

The memory (167) typically includes a nonvolatile memory, such as magnetic strip, a memory chip, a flash memory, a Read Only Memory (ROM), etc. to store the account information (142).

The information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

Optionally, the communication device (159) includes a semiconductor chip to implement a transceiver for communication with the reader (163) and an antenna to provide and/or receive wireless signals.

Typically, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

The account identification device (141) may be in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 8, such as a cellular communications subsystem.

The communication device (159) may access the account information (142) stored on the memory (167) without going through the processor (151).

Optionally, a account identification device (141) has fewer components than those illustrated in FIG. 8. For example, the account identification device (141) may not have the input device (153), the audio device (157) and the display device (155) in one example; and in another example, the account identification device (141) does not have components (151-159).

For example, an account identification device (141) can be in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142). Optionally, the account identification device (141) has the semiconductor chip but not the magnetic strip.

The account identification device (141) may be integrated with a security device, such as an access card, a radio frequency identification (RFID) tag, a security card, a transponder, etc.

Optionally, the account identification device (141) is a handheld and compact device. For example, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

The point of interaction (107) is configured to provide to the user (101) with an advertisement, or provide information derived from the transaction data (109).

Typically, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In some instances, the presentation of advertisements may be not a result of a user action.

The point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

The point of interaction (107) may be the same as the transaction terminal (105), such as a point of sale (POS) terminal, an automated teller machine (ATM), a mobile phone, a computer of the user for an online transaction, etc. The point of interaction (107) may be co-located with, or near, the transaction terminal (105) (e.g., a video monitor or display, a digital sign), or produced by the transaction terminal (e.g., a receipt produced by the transaction terminal (105)). The point of interaction (107) may be separate from and not co-located with the transaction terminal (105), such as a mobile phone, a personal digital assistant, a personal computer of the user, a voice mail box of the user, an email inbox of the user, a digital sign, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

Typically, the white space is part of a media channel available to present a message from the transaction handler (103) in connection with the processing of a transaction of the user (101). The white space may be in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

The advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, on digital signs, or on audio portals.

The transaction handler (103) may purchase the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

The point of interaction (107) may be used to primarily to access services not provided by the transaction handler (103), such as services provided by a search engine, a social networking website, an online marketplace, a blog, a news site, a television program provider, a radio station, a satellite, a publisher, etc.

A consumer device can be used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 9, with more or fewer components.

The consumer device may include an account identification device (141).

For example, a smart card used as an account identification device (141) is integrated with a mobile phone, or a personal digital assistant (PDA).

Optionally, the point of interaction (107) is integrated with a transaction terminal (105). For example, a self-service checkout terminal includes a touch pad to interact with the user (101); and an ATM machine includes a user interface subsystem to interact with the user (101).

Hardware

A computing apparatus can be configured to include some of the components illustrated in FIGS. 1, 3, and 5-8, such as the transaction handler (103), the profile generator (121), the media controller (115), the portal (143), the profile selector (129), the advertisement selector (133), the user tracker (113), the correlator (117), and their associated storage devices, such as the data warehouse (149).

At least some of the components illustrated in FIGS. 1, 3, 5-8, such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system illustrated in FIG. 9, with more or fewer components. Some of the modules may share hardware or be combined on a computer system. Optionally, a network of computers can be used to implement one or more of the components.

Further, the data illustrated in FIG. 5, such as transaction data (109), account data (111), transaction profiles (127), and advertisement data (135), can be stored in storage devices of one or more computers accessible to the corresponding modules illustrated in FIG. 5. For example, the transaction data (109) can be stored in the data warehouse (149) that can be implemented as a data processing system illustrated in FIG. 9, with more or fewer components.

Optionally, the transaction handler (103) is a payment processing system, or a payment card processor, such as a card processor for credit cards, debit cards, etc.

FIG. 9 illustrates a data processing system. While FIG. 9 illustrates various components of a computer system, it is not intended to represent any particular architecture or manner of interconnecting the components. Other systems that have fewer or more components than those shown in FIG. 9 may also be used.

In FIG. 9, the data processing system (170) includes an inter-connect (171) (e.g., bus and system core logic), which interconnects a microprocessor(s) (173) and memory (167). The microprocessor (173) is coupled to cache memory (179) in the example of FIG. 9.

The inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. When the data processing system is a server system, some of the I/O devices (175), such as printers, scanners, mice, and/or keyboards, are optional.

The inter-connect (171) includes one or more buses connected to one another through various bridges, controllers and/or adapters. The I/O controllers (177) include a USB (Universal Serial Bus) adapter for controlling USB peripherals, and/or an IEEE-1394 bus adapter for controlling IEEE-1394 peripherals.

The memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Computing processes can be implemented using hardwired circuitry without software instructions, or in combination with software instructions. Thus, the techniques are limited neither to any specific combination of hardware circuitry and software, nor to any particular source for the instructions executed by the data processing system.

The present disclosure includes fully functioning computers and computer systems that implement the described computing processes, as well as distributable computing products in a variety of forms, which when combined with the generic computing devices, configures the generic computing devices into the fully functional computers and computers that implement the described computing processes, regardless of the particular type of machine or computer-readable media used to actually effect the distribution.

At least some computing processes disclosed herein can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the computing processes may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In instances, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The entire disclosures of the patent documents discussed above are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
    a computing device configured on a vehicle, comprising:
        a set of sensors mounted on the vehicle, the set of sensors comprising at least one first sensor included in a seat of the vehicle and at least one second sensor to detect whether a seat belt of the vehicle is buckled; at least one first microprocessor; a wireless communication device; and
        a first memory storing instructions which when executed by the at least one first microprocessor cause the computing device to:
            obtain first measurement data from the set of sensors mounted on the vehicle;
            determine a first vehicle status from the first measurement data, wherein the first vehicle status comprises an identification of a presence of at least one unknown occupant based on the first measurement data from the at least one first sensor and the at least one second sensor;

receive a position of the vehicle; and transmit, via the wireless communication device to a remote server based on the first vehicle status, a communication identifying the position of the vehicle;

the remote server, comprising:

at least one second microprocessor; and a second memory storing instructions which when executed by the at least one second microprocessor cause the remote server to:

determine vehicles that are qualified to receive a message based on at least one known occupant and the presence of the at least one unknown occupant; and transmit, to a merchant device, a current count of the vehicles that are qualified to receive the message and current locations of the vehicles that are qualified to receive the message; and the merchant device, comprising:

at least one third microprocessor; and a third memory storing instructions which when executed by the at least one third microprocessor cause the merchant device to:

present, on a digital map, the current locations of the vehicles that are qualified to receive the message based on the at least one known occupant and the presence of the at least one unknown occupant;

wherein the instructions stored in the second memory of the remote server, when executed by the at least one second microprocessor of the remote server, further cause the remote server to:

receive, from the merchant device, instructions to cause the remote server to transmit, in real time, the message to the vehicles that are qualified to receive the message based on the current count of vehicles that are qualified to receive the message being above a threshold; and wherein the instructions stored in the first memory of the computing device, when executed by the at least one first microprocessor of the computing device, further cause the computing device to:

as a response to transmitting of the communication to the remote server, receive, in real time, the message from the remote server;

obtain second measurement data from the set of sensors mounted on the vehicle;

determine a second vehicle status from the second measurement data; and in response to determining of the second vehicle status, provide a user interface presenting the message.

2. The system of claim 1, wherein the computing device further comprises:

a wireless transceiver, wherein the instructions stored in the first memory of the computing device, when executed by the at least one first microprocessor of the computing device, further cause the computing device to determine an identity of the at least one known occupant of the vehicle.

3. The system of claim 2, wherein the computing device further comprises:

an infotainment system, wherein the instructions stored in the first memory of the computing device, when executed by the at least one first microprocessor of the computing device, further cause the computing device to provide the user interface via the infotainment system.

4. The system of claim 3, further comprising:

a position determination device, wherein the computing device receives the position of the vehicle from the position determination device.

5. A method implemented in a vehicle, the method comprising:

obtaining, by a computing device, first measurement data from a set of sensors mounted on the vehicle comprising at least one first sensor included in a seat of the vehicle and at least one second sensor to detect whether a seat belt of the vehicle is buckled;

determining, by the computing device, a first vehicle status from the first measurement data, wherein the first vehicle status comprises an identification of a presence of at least one unknown occupant based on the first measurement data from the at least one first sensor and the at least one second sensor;

receiving, by the computing device, a position of the vehicle;

transmitting, by the computing device to a remote server based on the first vehicle status, a communication identifying the position of the vehicle;

determine, by the remote server, vehicles that are qualified to receive a message based on at least one known occupant and the presence of the at least one unknown occupant;

transmitting, by the remote server to a merchant device, a current count of the vehicles that are qualified to receive the message and current locations of the vehicles that are qualified to receive the message;

presenting, on a digital map displayed by the merchant device, the current locations of the vehicles that are qualified to receive the message based on the at least one known occupant and the presence of the at least one unknown occupant;

receiving, by the remote server from the merchant device, instructions to cause the remote server to transmit, in real time, the message to the vehicles that are qualified to receive the message based on the current count of vehicles that are qualified to receive the message being above a threshold;

as a response to the transmitting of the communication to the remote server, receiving, by the computing device, the message from the remote server in real time;

obtaining, by the computing device, second measurement data from the set of sensors mounted on the vehicle;

determining, by the computing device, a second vehicle status from the second measurement data; and in response to the determining of the second vehicle status, providing, by the computing device, a user interface presenting the message.

6. The method of claim 5, wherein the communication further identifies an identity of the at least one known occupant of the vehicle.

7. The method of claim 6, further comprising:

determining, from wireless signals of a mobile device of the at least one known occupant, the identity of the at least one known occupant.

8. The method of claim 7, further comprising:

communicating to the remote server updates of a current position of the vehicle.

9. The method of claim 8, wherein a frequency of the updates is based on a location of the vehicle relative to a set of locations of interest, a speed of the vehicle, and a predicted travel route of the vehicle.

10. The method of claim 5, wherein the remote server is coupled to the vehicle via a cellular communication connection and configured to communicate, to a mobile apparatus, the current count of the vehicles that are qualified to receive the message; and wherein the threshold is adjustable via a communication from the mobile apparatus.

11. The method of claim 10, wherein the vehicles are determined to be qualified to receive the message based at least in part on the current locations of the vehicles.

12. The method of claim 11, wherein the communication further identifies a role of the at least one known occupant of the vehicle.

13. The method of claim 12, wherein the user interface is provided via an application running on a mobile device of the at least one known occupant.

14. The method of claim 13, further comprising:
monitoring a status of the application of the mobile device; and
present the message via the application when the application of the mobile device is in a predetermined mode.

15. The method of claim 12, wherein the user interface is provided via an infotainment system of the vehicle.

16. The method of claim 12, wherein the vehicles are determined to be qualified to receive the message based further on at least one transaction profile of the at least one known occupant.

* * * * *